United States Patent
Shimamoto et al.

(10) Patent No.: US 9,649,828 B2
(45) Date of Patent: *May 16, 2017

(54) INTERLAYER FOR LAMINATED GLASS AND LAMINATED GLASS

(75) Inventors: Michio Shimamoto, Osaka (JP); Shota Matsuda, Osaka (JP); Sinyul Yang, Osaka (JP); Kohei Kani, Kouka (JP); Tatsuya Iwamoto, Kouka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/876,062

(22) PCT Filed: Sep. 30, 2011

(86) PCT No.: PCT/JP2011/072615
§ 371 (c)(1),
(2), (4) Date: Mar. 26, 2013

(87) PCT Pub. No.: WO2012/043818
PCT Pub. Date: Apr. 5, 2012

(65) Prior Publication Data
US 2013/0202863 A1    Aug. 8, 2013

(30) Foreign Application Priority Data

Sep. 30, 2010 (JP) .................................. 2010-222873
Jan. 20, 2011 (JP) .................................. 2011-009787
Jun. 29, 2011 (JP) .................................. 2011-144861

(51) Int. Cl.
B32B 17/10    (2006.01)
B32B 27/08    (2006.01)
(Continued)

(52) U.S. Cl.
CPC .......... *B32B 17/10761* (2013.01); *B32B 7/02* (2013.01); *B32B 17/10036* (2013.01);
(Continued)

(58) Field of Classification Search
CPC ..... B32B 17/10761; B32B 27/08; B32B 7/08; B32B 17/10036; B32B 27/22;
(Continued)

(56) References Cited

U.S. PATENT DOCUMENTS 5,340,654 A     8/1994  Ueda et al.
2009/0305059 A1* 12/2009 Marumoto ........ B32B 17/10036
                                                        428/437
(Continued)

FOREIGN PATENT DOCUMENTS

EP    1 743 765 A2   1/2007
EP    2 287 125 A1   2/2011
(Continued)

OTHER PUBLICATIONS

International Search Report for the Application No. PCT/JP2011/072815 mailed Dec. 27, 2011.
(Continued)

*Primary Examiner* — Kevin R Kruer
(74) *Attorney, Agent, or Firm* — Cheng Law Group, PLLC

(57) ABSTRACT

The present invention aims to provide an intermediate film for laminated glass which, in the case of being used for constituting a laminated glass, enables to improve the sound-insulating property of a laminated glass to be obtained; and a laminated glass. The intermediate film 1 for laminated glass of the present invention comprises a first layer 2 which contains a polyvinyl acetal resin and a plasticizer and the degree of acetylation of the polyvinyl acetal resin contained in the first layer 2 exceeds 30 mol %; and The laminated glass of the present invention comprises
(Continued)

first and second components for laminated glass, and the intermediate film 1 for laminated glass sandwiched between the first and second components for laminated glass.

7 Claims, 2 Drawing Sheets

(51) Int. Cl.
    *B32B 7/02*     (2006.01)
    *C08K 5/00*     (2006.01)
    *B32B 27/30*     (2006.01)
    *B32B 27/22*     (2006.01)

(52) U.S. Cl.
    CPC .............. *B32B 27/08* (2013.01); *B32B 27/22* (2013.01); *B32B 27/30* (2013.01); *C08K 5/0016* (2013.01); *B32B 2250/03* (2013.01); *B32B 2307/102* (2013.01); *B32B 2605/08* (2013.01); *B32B 2605/10* (2013.01); *B32B 2605/12* (2013.01); *B32B 2605/18* (2013.01); *Y10T 428/24942* (2015.01); *Y10T 428/3163* (2015.04); *Y10T 428/31909* (2015.04)

(58) Field of Classification Search
    CPC .......... B32B 2250/03; B32B 2307/102; B32B 2605/08; B32B 2605/10; B32B 2605/12; B32B 2605/18; B32B 27/30; B32B 7/02; Y10T 428/24942; Y10T 428/31909; Y10T 428/3163
    USPC ......... 428/212, 436, 437, 524, 525; 524/557
    See application file for complete search history.

(56) References Cited

U.S. PATENT DOCUMENTS

| | | | |
|---|---|---|---|
| 2011/0070415 A1* | 3/2011 | Nakamura et al. | ............ 428/212 |
| 2012/0164457 A1* | 6/2012 | Fukatani | ............ B32B 17/10761 428/441 |
| 2012/0244329 A1* | 9/2012 | Iwamoto et al. | ............. 428/213 |
| 2012/0263958 A1* | 10/2012 | Iwamoto et al. | ............. 428/441 |
| 2012/0288722 A1* | 11/2012 | Iwamoto et al. | ............. 428/437 |

FOREIGN PATENT DOCUMENTS

| | | | |
|---|---|---|---|
| EP | 2 518 031 A1 | | 10/2012 |
| EP | 2 518 032 A1 | | 10/2012 |
| EP | 2 623 472 A1 | | 8/2013 |
| EP | 2 623 474 A1 | | 8/2013 |
| EP | 2 698 357 A1 | | 2/2014 |
| JP | 6-926 A | | 1/1994 |
| JP | 2003-252655 A | | 9/2003 |
| JP | 2004-67427 A | | 3/2004 |
| JP | 2004-075501 | * | 3/2004 |
| JP | 2004-143008 A | | 5/2004 |
| JP | 2006-248826 A | | 9/2006 |
| JP | 2007-70200 A | | 3/2007 |
| JP | 2011-68537 A | | 4/2011 |
| WO | 2009013195 | * | 10/2009 |
| WO | 2011078314 | * | 6/2011 |
| WO | 2011081190 | * | 7/2011 |

OTHER PUBLICATIONS

Written Opinion of the International Searching Authority (PCT/ISA/237) for the Application No. PCT/JP2011/072615 mailed Dec. 27, 2011.

Written Opinion of the International Searching Authority (PCT/ISA/237) for the Application No. PCT/JP2011/072615 mailed Dec. 27, 2011 (English Translation mailed May 2, 2013).

The First Office Action for the Application No. 201180047678.X from The State Intellectual Property Office of the People's Republic of China dated Nov. 15, 2014.

Supplementary European Search Report for the Application No. EP 11 82 9371 dated Jun. 24, 2016.

* cited by examiner

INTERLAYER FOR LAMINATED GLASS AND LAMINATED GLASS

CROSS REFERENCE TO RELATED APPLICATIONS

The present application is a 371 application of PCT/JP2011/072615, filed Sep. 30, 2011, which is based on Japanese Patent Application Nos. 2010-222873 filed on Sep. 30, 2010, 2011-009787 filed on Jan. 20, 2011, and 2011-144861 filed Jun. 29, 2011, the entire contents of which are hereby incorporated by reference into the present application.

TECHNICAL FIELD

The present invention relates to an intermediate film for laminated glass used for laminated glasses of automobiles and buildings. The present invention specifically relates to an intermediate film for laminated glass containing a polyvinyl acetal resin and a plasticizer, and a laminated glass comprising the intermediate film for laminated glass.

BACKGROUND ART

Laminated glasses scatter fewer pieces of broken glass when they are damaged by external impact, and thus are excellently safe. Therefore, such laminated glasses are widely used in automobiles, railway carriages, aircrafts, ships, buildings, and the like. The laminated glass is produced by interposing an intermediate film between a pair of glass plates.

In order to reduce the weight of a laminated glass, studies have recently been performed for making a laminated glass thin. A thinner laminated glass, however, has a reduced sound-insulating property. If a laminated glass with a reduced sound-insulating property is used for the windshield of an automobile, its sound-insulating property is disadvantageously insufficient against sounds at a register of about 5,000 Hz, such as wind noise and driving sound of wipers.

Then, additional studies have been performed for increasing the sound-insulating property of a laminated glass by changing materials of an intermediate film.

Patent Document 1 discloses, as one example of an intermediate film for laminated glass, a sound-insulating layer comprising 100 parts by weight of a polyvinyl acetal resin with a degree of acetalization of 60 to 85 mol %, 0.001 to 1.0 parts by weight of at least one metal salt selected from alkali metal salts and alkaline earth metal salts, and 30 parts by weight or more of a plasticizer. This sound-insulating layer can be used alone as an intermediate film, or can be laminated with another layer and used as a multilayer intermediate film.

PRIOR ART DOCUMENT

Patent Document

Patent Document 1: JP 2007-070200 A

SUMMARY OF THE INVENTION

Problems to be Solved by the Invention

The intermediate film for laminated glass disclosed in the above Patent Document 1 can improve the sound-insulating property of a laminated glass to some extent, but a further improved sound-insulating property is required.

In the case of forming a laminated glass using the intermediate film disclosed in Patent Document 1, for example, the sound-insulating property of the laminated glass in a relatively high frequency range is insufficient, and thus reduction in the sound-insulating property due to the coincidence effect cannot be avoided in some cases. In particular, the sound-insulating property of this laminated glass may be insufficient at around 20° C.

Here, the coincidence effect is a phenomenon that, when sound waves strike a glass plate, the transverse wave is propagated on the glass surface due to the rigidity and inertia of the glass plate, and then the transverse wave resonates with the incident sound, so that the sound is transmitted.

Further, in the case of forming a laminated glass using a multilayer intermediate film disclosed in Patent Document 1 in which the sound-insulating layer and other layers are laminated, the sound-insulating property of the laminated glass at around 20° C. can be improved to some extent. In this case, however, the multilayer intermediate film has the sound-insulating layer, and thus bubble formation may occur in the laminated glass including the multilayer intermediate film.

Furthermore, recently, it has been studied to increase the amount of a plasticizer contained in an intermediate film in order to improve the sound-insulating property of a laminated glass. As the amount of a plasticizer in an intermediate film increases, the sound-insulating property of the laminated glass can be improved. If the amount of a plasticizer increases, however, bubble formation may occur in the laminated glass.

An object of the present invention is to provide an intermediate film for laminated glass which, if it is used for forming a laminated glass, can improve the sound-insulating property of the laminated glass to be obtained; and a laminated glass comprising the intermediate film for laminated glass.

A limitative object of the present invention is to provide an intermediate film for laminated glass which can provide a laminated glass that not only has a high sound-insulating property but also suppresses bubble formation and bubble growth; and a laminated glass comprising the intermediate film for laminated glass.

Means for Solving the Problems

According to one wide aspect of the present invention, an intermediate film for laminated glass with a single layer structure or a laminated structure of two or more layers is provided, the intermediate film comprising: a first layer containing a polyvinyl acetal resin and a plasticizer, wherein a degree of acetylation of the polyvinyl acetal resin contained in the first layer exceeds 30 mol %. The intermediate film for laminated glass of the present invention may be a single layer intermediate film for laminated glass only comprising the first layer, or may be a multilayer intermediate film for laminated glass comprising the first layer.

In a certain specific aspect of the intermediate film for laminated glass of the present invention, the intermediate film for laminated glass has a laminated structure of two or more layers, further comprising a second layer disposed at the side of a first surface of the first layer.

In another specific aspect of the intermediate film for laminated glass of the present invention, the second layer contains a polyvinyl acetal resin, and a degree of acetylation of the polyvinyl acetal resin contained in the second layer is lower than the degree of acetylation of the polyvinyl acetal resin contained in the first layer.

In still another specific aspect of the intermediate film for laminated glass of the present invention, the degree of acetylation of the polyvinyl acetal resin contained in the second layer is 30 mol % or lower.

In another specific aspect of the intermediate film for laminated glass of the present invention, the second layer contains the polyvinyl acetal resin and a plasticizer, and an amount of the plasticizer for each 100 parts by weight of the polyvinyl acetal resin in the second layer is less than an amount of the plasticizer for each 100 parts by weight of the polyvinyl acetal resin in the first layer.

In still another specific aspect of the intermediate film for laminated glass of the present invention, the second layer is laminated on the first surface of the first layer.

In another specific aspect of the intermediate film for laminated glass of the present invention, the intermediate film for laminated glass has a laminated structure of two or more layers, the intermediate film further comprising a second layer which is laminated on a first surface of the first layer and which contains a polyvinyl acetal resin and a plasticizer, wherein an amount of the plasticizer is 50 parts by weight or more for each 100 parts by weight of the polyvinyl acetal resin in the first layer, a hydroxy group content in the polyvinyl acetal resin contained in the first layer is lower than a hydroxy group content in the polyvinyl acetal resin contained in the second layer, the difference between the hydroxy group content in the polyvinyl acetal resin contained in the first layer and the hydroxy group content in the polyvinyl acetal resin contained in the second layer is 9.2 mol % or smaller, and the degree of acetylation of the polyvinyl acetal resin contained in the first layer is 8 mol % or lower if the difference between the hydroxy group content in the polyvinyl acetal resin contained in the first layer and the hydroxy group content in the polyvinyl acetal resin contained in the second layer is greater than 8.5 mol % but not greater than 9.2 mol %.

In still another specific aspect of the intermediate film for laminated glass of the present invention, the polyvinyl acetal resin contained in the first layer contains a high-molecular-weight component with an absolute molecular weight of 1,000,000 or higher and a proportion of the high-molecular-weight component in the polyvinyl acetal resin contained in the first layer is 7.4% or higher, or the polyvinyl acetal resin contained in the first layer contains a high-molecular-weight component with a molecular weight in terms of polystyrene of 1,000,000 or higher and a proportion of the high-molecular-weight component in the polyvinyl acetal resin contained in the first layer is 9% or higher.

In another specific aspect of the intermediate film for laminated glass of the present invention, a ratio (G'(Tg+80)/G'(Tg+30)) of an elastic modulus G'(Tg+80) at (Tg+80)° C. to an elastic modulus G'(Tg+30) at (Tg+30)° C. is 0.65 or higher, provided that the first layer is used as a resin film and a viscoelasticity of the resin film is measured, and that Tg (° C.) represents a glass transition temperature of the resin film.

In still another specific aspect of the intermediate film for laminated glass of the present invention, a ratio (G'(Tg+80)/G'(Tg+30)) of an elastic modulus G'(Tg+80) at (Tg+80)° C. to an elastic modulus G'(Tg+30) at (Tg+30)° C. is 0.65 or higher, provided that a resin film containing 100 parts by weight of the polyvinyl acetal resin contained in the first layer and 60 parts by weight of triethylene glycol di-2-ethyl hexanoate (3GO) as a plasticizer is prepared and a viscoelasticity of the resin film is measured, and that Tg (° C.) represents a glass transition temperature of the resin film.

In another specific aspect of the intermediate film for laminated glass of the present invention, the polyvinyl acetal resin contained in the first layer is obtained by acetalizing a polyvinyl alcohol resin having an average degree of polymerization exceeding 3,000.

In another specific aspect of the intermediate film for laminated glass of the present invention, the intermediate film for laminated glass has a laminated structure of three or more layers, the intermediate film further comprising: a second layer disposed at the side of a first surface of the first layer; and a third layer disposed at the side of a second surface that is opposite to the first surface of the first layer.

In another specific aspect of the intermediate film for laminated glass of the present invention, the third layer contains a polyvinyl acetal resin, and a degree of acetylation of the polyvinyl acetal resin contained in the third layer is lower than a degree of acetylation of the polyvinyl acetal resin contained in the first layer.

In still another specific aspect of the intermediate film for laminated glass of the present invention, the degree of acetylation of the polyvinyl acetal resin contained in the third layer is 30 mol % or lower.

In another specific aspect of the intermediate film for laminated glass of the present invention, the third layer contains a polyvinyl acetal resin and a plasticizer, and an amount of the plasticizer for each 100 parts by weight of the polyvinyl acetal resin in the third layer is lower than an amount of the plasticizer for each 100 parts by weight of the polyvinyl acetal resin in the first layer.

In still another specific aspect of the intermediate film for laminated glass of the present invention, the third layer is laminated on the second surface of the first layer.

The laminated glass of the present invention comprises a first component for laminated glass; a second component for laminated glass; and an intermediate film sandwiched between the first component for laminated glass and the second component for laminated glass, wherein the intermediate film is the intermediate film for laminated glass formed according to the present invention.

Effect of the Invention

The intermediate film for laminated glass of the present invention comprises a first layer which contains a polyvinyl acetal resin and a plasticizer, and the degree of acetylation of the polyvinyl acetal resin contained in the first layer exceeds 30 mol %. Thus, the sound-insulating property of a laminated glass comprising the intermediate film for laminated glass of the present invention can be improved.

MODE(S) FOR CARRYING OUT THE INVENTION

Figure 1:
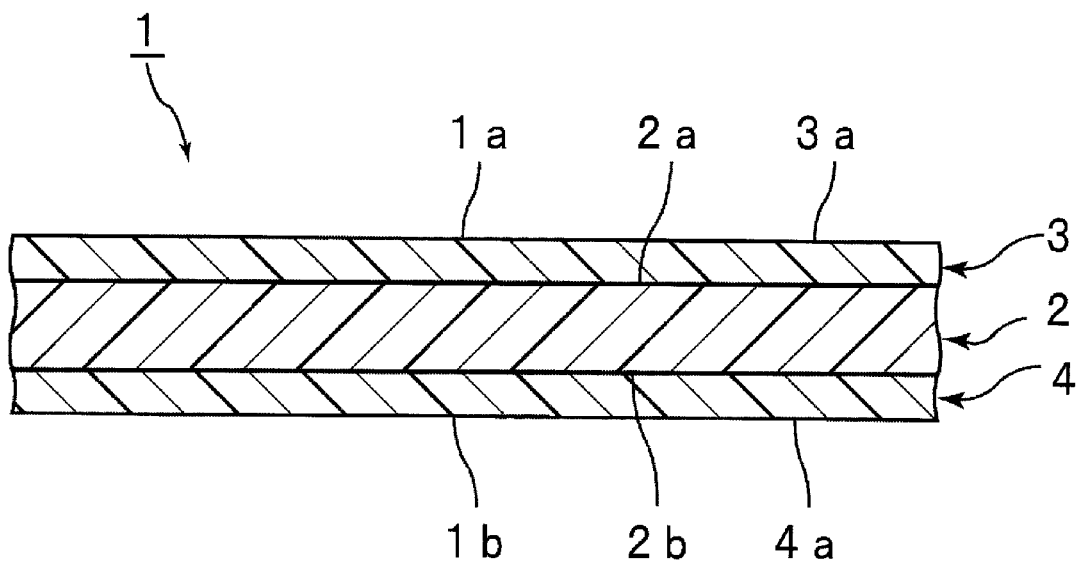
FIG. 1 is a partially cut cross-sectional view schematically showing an intermediate film for laminated glass according to one embodiment of the present invention.

The following will describe specific embodiments and examples of the present invention referring to the drawings, and thereby clarify the present invention.

FIG. 1 is a partially cut cross-sectional view schematically showing an intermediate film for laminated glass according to one embodiment of the present invention.

An intermediate film 1 shown in FIG. 1 is a multilayer intermediate film. The intermediate film 1 is used for obtaining a laminated glass. The intermediate film 1 is an intermediate film for laminated glass. The intermediate film 1 comprises a first layer 2, a second layer 3 disposed on the side of a first surface 2a of the first layer 2, and a third layer 4 disposed on the side of a second surface 2b opposite to the first surface 2a of the first layer 2. The second layer 3 is laminated on the first surface 2a of the first layer 2. The third layer 4 is laminated on the second surface 2b of the first layer 2. The first layer 2 is an intermediate layer, and mainly functions as a sound-insulating layer. The second layer 3 and the third layer 4 are protecting layers, and are surface layers in the present embodiment. The first layer 2 is disposed between the second layer 3 and the third layer 4. The first layer 2 is sandwiched between the second layer 3 and the third layer 4. Thus, the intermediate film 1 has a multilayer structure in which the second layer 3, the first layer 2, and the third layer 4 are laminated in this order.

In addition, other layers may be laminated between the first layer 2 and the second layer 3 and between the first layer 2 and the third layer 4. Preferably, the first layer 2 and the second layer 3, and the first layer 2 and the third layer 4 each are laminated directly. Examples of other layers include layers containing a thermoplastic resin such as polyvinyl acetal resin, and layers containing polyethylene terephthalate.

The first layer 2 contains a polyvinyl acetal resin with a degree of acetylation exceeding 30 mol % and a plasticizer. The second layer 3 preferably contains a polyvinyl acetal resin, and preferably contains a polyvinyl acetal resin and a plasticizer. The second layer 3 contains, for example, a polyvinyl acetal resin with a degree of acetylation of 30 mol % or lower and a plasticizer. The third layer 4 preferably contains a polyvinyl acetal resin, and preferably contains a polyvinyl acetal resin and a plasticizer. The third layer 4 contains, for example, a polyvinyl acetal resin with a degree of acetylation of 30 mol % or lower and a plasticizer. The composition of the first layer 2 and the compositions of the second layer 3 and the third layer 4 are preferably different from each other. The compositions of the second layer 3 and the third layer 4 may be the same as or different from each other.

The main features of the present embodiment are that the first layer 2 containing a polyvinyl acetal resin and a plasticizer is comprised and a degree of acetylation of the polyvinyl acetal resin contained in the first layer 2 has a degree of acetylation exceeds 30 mol %. In particular, the present embodiment has an important feature in that the degree of acetylation of the polyvinyl acetal resin contained in the first layer 2 is as high as exceeding 30 mol %. Thereby, the sound-insulating property of a laminated glass comprising the intermediate film 1 can be improved.

Especially, the first layer 2 containing a polyvinyl acetal resin with a degree of acetylation exceeding 30 mol % can improve the sound-insulating property within a temperature range of 20° C. to 30° C.

In recent years, fuel automobiles using internal-combustion engines are being switched over to electric vehicles using electric motors, and hybrid electric vehicles using internal-combustion engines and electric motors, and the like. Laminated glasses used for fuel automobiles using internal-combustion engines are particularly required to have a sound-insulating property against sounds in a relatively low frequency range. Even laminated glasses used for fuel automobiles using internal-combustion engines also preferably have a high sound-insulating property against sounds in a high frequency range. In contrast, laminated glasses used for electric vehicles and hybrid electric vehicles utilizing electric motors are particularly required to have a high sound-insulating property against sounds in a high frequency range in order to effectively insulate driving sounds of their electric motors.

The present inventors have also found that the first layer 2 containing a polyvinyl acetal resin with a degree of acetylation exceeding 30 mol % can effectively and sufficiently improve the sound-insulating property in a high frequency range of a laminated glass.

In the intermediate film 1, the second layer 3 and the third layer 4 are laminated on the respective faces of the first layer 2. The second layer is preferably disposed on the side of a first surface of the first layer, and the second layer is preferably laminated on the first surface of the first layer. The second layer may be disposed only on the side of the first surface of the first layer, and the third layer may not be disposed on the side of a second surface of the first layer. Nevertheless, it is preferable that the second layer is disposed on the side of the first surface of the first layer and the third layer is disposed on the second surface of the first layer. The third layer is preferably laminated on the second surface of the first layer. As the third layer is laminated on the second surface of the first layer, the penetration resistance of a laminated glass comprising the intermediate film 1 can be further improved.

With an intermediate film for laminated glass having a multilayer structure that provides an improved sound-insulating property, bubble formation problematically easily occurs in the laminated glass. With respect to such a problem, the present inventors have found that, in an intermediate film for laminated glass with a multilayer structure, plasticizers transfer between the respective layers and, as a result, a layer containing a larger amount of plasticizer is formed, that is, for example, the plasticizers transfer from the second layer and the third layer to the first layer so that the amount of the plasticizer in the first layer increases. The present inventors have further found that, as the layer containing a larger amount of plasticizer is formed, in other words, as the amount of the plasticizer in the first layer increases, bubble formation is likely to occur in a laminated glass comprising the intermediate film for laminated glass, and bubble formation once occurs, the generated bubbles tend to serve as cores and thereby to cause bubble growth.

From the viewpoint of suppressing bubble formation and bubble growth in a laminated glass, preferably, the amount of the plasticizer is 50 parts by weight or more for each 100 parts by weight of the polyvinyl acetal resin in the first layer 2; the hydroxy group content in the polyvinyl acetal resin contained in the first layer 2 is lower than the hydroxy group content in the polyvinyl acetal resin contained in the second layer 3; the difference between the hydroxy group content in the polyvinyl acetal resin contained in the first layer 2 and the hydroxy group content in the polyvinyl acetal resin contained in the second layer 3 (hereinafter, also referred to as a content difference (1–2)) is 9.2 mol % or smaller; and if the difference between the hydroxy group content in the polyvinyl acetal resin contained in the first layer 2 and the hydroxy group content in the polyvinyl acetal resin contained in the second layer 3 (content difference (1–2)) is greater than 8.5 mol % but not greater than 9.2 mol %, the degree of acetylation of the polyvinyl acetal resin contained in the first layer 2 is preferably 8 mol % or lower. The content difference (1–2) may be greater than 8.5 mol % but not greater than 9.2 mol %, and further may be 8.5 mol % or smaller.

Preferably, the hydroxy group content in the polyvinyl acetal resin contained in the first layer 2 is lower than the hydroxy group content in the polyvinyl acetal resin contained in the third layer 4; the difference between the hydroxy group content in the polyvinyl acetal resin contained in the first layer 2 and the hydroxy group content in the polyvinyl acetal resin contained in the third layer 4 (hereinafter, also referred to as a content difference (1–3)) is 9.2 mol % or smaller; and if the difference between the hydroxy group content in the polyvinyl acetal resin contained in the first layer 2 and the hydroxy group content in the polyvinyl acetal resin contained in the third layer 4 (content difference (1–3)) is greater than 8.5 mol % but not greater than 9.2 mol %, the degree of acetylation of the polyvinyl acetal resin contained in the first layer 2 is 8 mol % or lower. Even in the case that the content difference (1–3) is 8.5 mol % or smaller, however, the degree of acetylation of the polyvinyl acetal resin contained in the first layer 2 is preferably 8 mol % or lower if the content difference (1–2) is greater than 8.5 mol % but not greater than 9.2 mol %. The content difference (1–3) may be greater than 8.5 mol % but not greater than 9.2 mol % or lower, and further may be 8.5 mol % or smaller.

The present inventors have performed studies for suppressing bubble formation and bubble growth, and thereby found that the aforementioned control of the hydroxy group contents in the polyvinyl acetal resins contained in the first layer, the second layer and the third layer enables to sufficiently suppress bubble formation and bubble growth in a laminated glass. Since transition of the plasticizer can be suppressed and bubble formation and bubble growth in a laminated glass can be sufficiently suppressed, the amount of the plasticizer in each layer, especially the amount of the plasticizer in the first layer 2, can be increased. As a result, the sound-insulating property of the laminated glass can be furthermore improved.

If the amount of the plasticizer for each 100 parts by weight of the polyvinyl acetal resin in the first layer 2 is more than the amount of the plasticizer for each 100 parts by weight of the polyvinyl acetal resin in each of the second layer 3 and the third layer 4, bubble formation tends to more easily occur. In addition, bubble formation once occurs, the generated bubbles tend to serve as cores and thereby to cause bubble growth. In contrast, if the hydroxy group contents in the polyvinyl acetal resins contained in the first layer, the second layer and the third layer are controlled as mentioned above, bubble formation and bubble growth in a laminated glass can be sufficiently suppressed.

From the viewpoint of further suppressing bubble formation and bubble growth in a laminated glass, with respect to the difference between the hydroxy group content in the polyvinyl acetal resin contained in the first layer 2 and each of the hydroxy group contents in the polyvinyl acetal resins contained in the second layer 3 and the third layer 4 (content difference (1–2) and content difference (1–3)), the lower limit thereof is preferably 0.1 mol %, more preferably 1 mol %, and still more preferably 2 mol %, whereas the upper limit thereof is preferably 8.5 mol %, more preferably 7.8 mol %, still more preferably 7 mol %, and particularly preferably 5.6 mol %. Because bubble formation and bubble growth can be furthermore suppressed in a laminated glass, the difference between the hydroxy group content in the polyvinyl acetal resin contained in the first layer 2 and each of the hydroxy group contents in the polyvinyl acetal resins contained in the second layer 3 and the third layer 4 (content difference (1–2) and content difference (1–3)) is preferably 5 mol % or smaller, more preferably 4.5 mol % or smaller, still more preferably 4 mol % or smaller, and furthermore preferably 3.5 mol % or smaller.

Preferably, the polyvinyl acetal resin contained in the first layer 2 contains a high-molecular-weight component with an absolute molecular weight of 1,000,000 or higher (hereinafter, also referred to as a high-molecular-weight component X), or the polyvinyl acetal resin contained in the first layer 2 contains a high-molecular-weight component with a polystyrene-equivalent molecular weight (hereinafter, also referred to as a molecular weight y) of 1,000,000 or higher (hereinafter, also referred to as a high-molecular-weight component Y). The high-molecular-weight component X and the high-molecular-weight component Y are polyvinyl acetal resins. The proportion of the high-molecular-weight component X in the polyvinyl acetal resin contained in the first layer 2 is preferably 7.4% or higher, or the proportion of the high-molecular-weight component Y in the polyvinyl acetal resin contained in the first layer 2 is preferably 9% or higher.

As the polyvinyl acetal resin contained in the first layer 2 contains the high-molecular-weight component X with an absolute molecular weight of 1,000,000 or higher at the aforementioned specific proportion, bubble formation in a laminated glass can be suppressed. As the polyvinyl acetal resin contained in the first layer 2 contains the high-molecular-weight component Y with a molecular weight y of 1,000,000 or higher at the aforementioned specific proportion, bubble formation in a laminated glass can also be suppressed.

The proportion of the high-molecular-weight component X in the polyvinyl acetal resin contained in the first layer 2 is defined as a value in terms of percentage (%) of the ratio of the area of a region corresponding to the high-molecular-weight component X in the peak area of the polyvinyl acetal resin component obtained upon measuring the absolute molecular weight. Also, the proportion of the high-molecular-weight component Y in the polyvinyl acetal resin contained in the first layer 2 is defined as a value in terms of percentage (%) of the ratio of the area of a region corresponding to the high-molecular-weight component Y in the peak area of the polyvinyl acetal resin component obtained upon measuring the molecular weight in terms of polystyrene.

The compositions of the second layer 3 and the third layer 4 each are preferably different from the composition of the first layer 2. The polyvinyl acetal resin in each of the second layer 3 and the third layer 4 may contain a high-molecular-weight component X with an absolute molecular weight of 1,000,000 or higher and the proportion of the high-molecular-weight component X in the polyvinyl acetal resin contained in each of the second layer 3 and the third layer 4 may be 7.4% or higher. It may also contain a high-molecular-weight component Y with a molecular weight y of 1,000,000 or higher and the proportion of the high-molecular-weight component Y in the polyvinyl acetal resin contained in each of the second layer 3 and the third layer 4 may be 9% or higher.

From the viewpoints of further improving the sound-insulating property of a laminated glass and further suppressing bubble formation and bubble growth, with respect to the proportion of the high-molecular-weight component X with an absolute molecular weight of 1,000,000 or higher in the polyvinyl acetal resin contained in the first layer 2, a preferable lower limit is 8%, a more preferable lower limit is 8.5%, a still more preferable lower limit is 9%, a particularly preferable lower limit is 9.5%, and a most preferable lower limit is 10%. Because the sound-insulating property of a laminated glass can be further improved and bubble formation and bubble growth can be further suppressed, the proportion of the high-molecular-weight component X is preferably 11% or higher, more preferably 12% or higher, still more preferably 14% or higher, and particularly preferably 16% or higher. The upper limit of the proportion of the high-molecular-weight component X is not particularly limited, and a preferable upper limit is 40%, a more preferable upper limit is 30%, and a still more preferable upper limit is 25%.

In the case that the polyvinyl acetal resin contained in the first layer 2 contains the high-molecular-weight component Y with a molecular weight y of 1,000,000 or higher, with respect to the proportion of the high-molecular-weight component Y with a molecular weight y of 1,000,000 or higher in the polyvinyl acetal resin contained in the first layer 2 containing the high-molecular-weight component Y, a preferable lower limit is 10%, a more preferable lower limit is 11%, a still more preferable lower limit is 11.5%, and a particularly preferable lower limit is 12%. Because the sound-insulating property of a laminated glass can be further improved and bubble formation and bubble growth can be further improved, the proportion of the high-molecular-weight component Y is preferably 12.5% or higher, more preferably 13.5% or higher, still more preferably 14% or higher, particularly preferably 15% or higher, and most preferably 18% or higher. The upper limit of the proportion of the high-molecular-weight component Y is not particularly limited, and a preferable upper limit is 40%, a more preferable upper limit is 30%, and a still more preferable upper limit is 25%. If the proportion of the high-molecular-weight component Y is not lower than the lower limit, the sound-insulating property of a laminated glass can be further improved and bubble formation and bubble growth can be further suppressed.

In the case that a resin film A containing 100 parts by weight of the polyvinyl acetal resin contained in the first layer 2 and 60 parts by weight of triethylene glycol di-2-ethyl hexanoate (3GO) as a plasticizer is used and the viscoelasticity of the resin film A is measured (test method A), the ratio $(G'(Tg+80)/G'(Tg+30))$ of the elastic modulus $G'(Tg+80)$ at $(Tg+80)° C.$ to the elastic modulus $G'(Tg+30)$ at $(Tg+30)° C.$ is preferably 0.65 or higher, provided that $Tg(° C.)$ represents a glass transition temperature of the resin film A.

Also, in the case that the first layer 2 is used as a resin film B and the viscoelasticity of the resin film B is measured (test method B), the ratio $(G'(Tg+80)/G'(Tg+30))$ of the elastic modulus $G'(Tg+80)$ at $(Tg+80)° C.$ to the elastic modulus $G'(Tg+30)$ at $(Tg+30)° C.$ is preferably 0.65 or higher, provided that $Tg(° C.)$ represents the glass transition temperature of the resin film B.

In the test method B, the first layer 2 is used as the resin film B, and the first layer 2 itself is the resin film B.

The resin film B is the first layer 2, and it contains the polyvinyl acetal resin and the plasticizer at the weight ratio as in the first layer 2. In the test method B, preferably, the plasticizer is transferred in the intermediate film 1 for laminated glass, and then the elastic modulus $G'(Tg+80)$ and the elastic modulus $G'(Tg+30)$ are measured. In the test method B, more preferably, the intermediate film 1 for laminated glass is stored at a humidity of 30% (±3%) and at a temperature of 23° C. for one month so that the plasticizer is transferred in the intermediate film 1 for laminated glass, and then the elastic modulus $G'(Tg+80)$ and the elastic modulus $G'(Tg+30)$ are measured.

The present inventors have performed studies for suppressing bubble formation and bubble growth, and thereby also found that a ratio $(G'(Tg+80)/G'(Tg+30))$ of 0.65 or higher in the test method A or the test method B enables to sufficiently suppress bubble formation and bubble growth in a laminated glass. Even in the case that the amount of the plasticizer in the first layer 2 is large, bubble formation and bubble growth in a laminated glass can be sufficiently suppressed. Thus, the sound-insulating property of the laminated glass can be improved. In particular, use of an intermediate film 1 for laminated glass in which the second layer 3 and the third layer 4 are laminated on the respective surfaces of the first layer 2 configured to have a ratio $(G'(Tg+80)/G'(Tg+30))$ of 0.65 or higher leads to further suppression of bubble formation and bubble growth in a laminated glass.

The ratio $(G'(Tg+80)/G'(Tg+30))$ is 0.65 or higher, and preferably 1.0 or lower. A ratio $(G'(Tg+80)/G'(Tg+30))$ of 0.65 or higher may enable to sufficiently suppress bubble formation and bubble growth in a laminated glass even after the laminated glass is stored under considerably severe conditions or for a long term. Further, a ratio $(G'(Tg+80)/G'(Tg+30))$ not lower than the lower limit and not higher than the upper limit may enable to more effectively suppress bubble formation and bubble growth in a laminated glass even after the laminated glass is stored under considerably severe conditions or for a long term.

From the viewpoint of sufficiently improving the sound-insulating property of a laminated glass, the amount of the plasticizer is preferably 40 parts by weight or more for each 100 parts by weight of the polyvinyl acetal resin in the first layer 2. Even in the case that the amount of the plasticizer in the first layer is large, the first layer configured to have a ratio $(G'(Tg+80)/G'(Tg+30))$ of 0.65 or higher may enable to suppress bubble formation and bubble growth in a laminated glass.

The glass transition temperature $Tg(° C.)$ indicates a peak temperature of the loss factor tan δ obtainable from the measurement result of the viscoelasticity. From the viewpoint of further suppressing bubble formation and bubble growth in a laminated glass, the ratio $(G'(Tg+80)/G'(Tg+30))$ is more preferably 0.7 or higher, whereas more preferably 0.95 or lower, and still more preferably 0.75 or higher, whereas still more preferably 0.9 or lower. Particularly, in the case of controlling the ratio $(G'(Tg+80)/G'(Tg+30))$ by the average degree of polymerization of polyvinyl alcohol resin, the ratio $(G'(Tg+80)/G'(Tg+30))$ is preferably 0.65 or higher, more preferably 0.66 or higher, still more preferably 0.67 or higher, and particularly preferably 0.7 or higher, whereas preferably 0.82 or lower, and more preferably 0.8 or lower, because bubble formation and bubble growth in a laminated glass can be sufficiently suppressed and the sound-insulating property of the laminated glass can be further improved. Furthermore, if the ratio $(G'(Tg+80)/G'(Tg+30))$ is 0.82 or lower, or 0.8 or lower, an intermediate film can be easily formed.

Examples of the method for controlling the ratio $(G'(Tg+80)/G'(Tg+30))$ measured by the test method A or the test method B to 0.65 or higher include a method of using a polyvinyl alcohol resin with a relatively high average degree of polymerization upon synthesis of a polyvinyl acetal resin to be contained in the first layer 2; and a method of strengthening the inter-molecular interaction of the polyvinyl acetal resin contained in the first layer 2. Examples of the method of strengthening the inter-molecular interaction of the polyvinyl acetal resin contained in the first layer 2 include a method of physically cross-linking the molecules of the polyvinyl acetal resin, and a method of chemically cross-linking the molecules. Particularly preferable are a method of using a polyvinyl alcohol resin with a relatively high average degree of polymerization upon synthesis of a polyvinyl acetal resin to be contained in the first layer 2 and a method of physically cross-linking the molecules of the polyvinyl acetal resin contained in the first layer 2 because the intermediate film 1 can be easily formed using an extruder.

Figure 3:
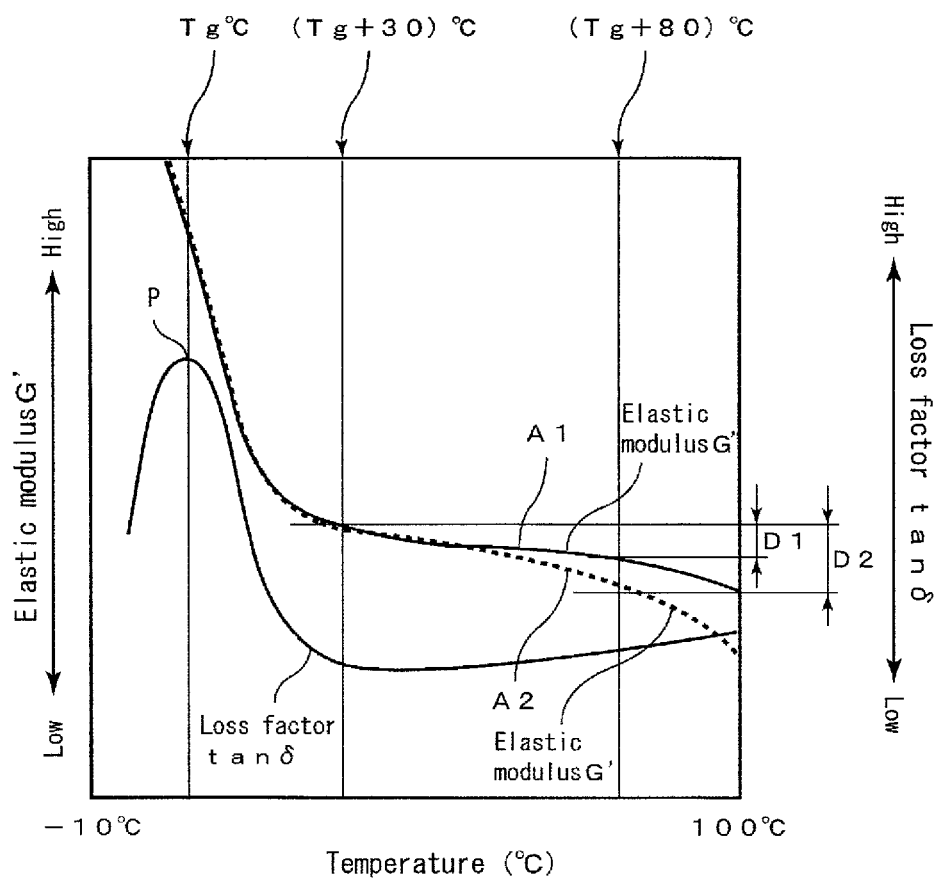
FIG. 3 is a diagram for illustrating the relationship between the loss factor tan δ and the temperature and the relationship between the elastic modulus G' and the temperature in the case that a resin film containing a polyvinyl acetal resin and triethylene glycol di-2-ethyl hexanoate contained in the first layer is prepared and the viscoelasticity of the resin film is measured.

The following will describe one example of the relationship between the loss factor tan δ and the temperature and the relationship between the elastic modulus G' and the temperature obtained by the aforementioned measurement of the viscoelasticity referring to FIG. 3.

The loss factor tan δ and the temperature show the relationship shown in FIG. 3. The temperature at the peak P of the loss factor tan δ is the glass transition temperature Tg.

In FIG. 3, the glass transition temperature Tg in the elastic modulus G' drawn with the broken line A2 and the glass transition temperature Tg in the elastic modulus G' drawn with the solid line A1 are the same temperature. For example, as the amount of change D of the elastic modulus G'(Tg+80) based on the elastic modulus G'(Tg+30) is smaller, bubble formation and bubble growth in a laminated glass can be more effectively suppressed. The amount of change D1 in the elastic modulus G' drawn with the solid line A1 is smaller than the amount of change D2 in the elastic modulus G' drawn with the broken line A2. Thus, in FIG. 3, bubble formation and bubble growth in a laminated glass can be more effectively suppressed in the case of the elastic modulus G' drawn with the solid line A1 in which the amount of change D1 is relatively small than in the case of the elastic modulus G' drawn with the broken line A2 in which the amount of change D2 is relatively large.

The elastic modulus G'(Tg+30) is preferably 200,000 Pa or higher. The elastic modulus G'(Tg+30) is more preferably 220,000 Pa or higher, still more preferably 230,000 Pa or higher, and particularly preferably 240,000 Pa or higher, whereas preferably 10,000,000 Pa or lower, more preferably 5,000,000 Pa or lower, particularly preferably 1,000,000 Pa or lower, most preferably 500,000 Pa or lower, and still most preferably 300,000 Pa or lower. An elastic modulus G'(Tg+30) not lower than the lower limit may enable to further suppress bubble formation and bubble growth in a laminated glass.

Here, the relationship between the elastic modulus G' and the temperature is greatly influenced by the type of a polyvinyl acetal resin and, in particular, it is greatly influenced by the average degree of polymerization of the polyvinyl alcohol resin used for providing a polyvinyl acetal resin. The relationship is not greatly influenced by the type of a plasticizer and, if the plasticizer is used in a usual amount of plasticizer, the amount of the plasticizer does not have a great influence thereon. In the case of using a plasticizer such as a monobasic organic acid ester other than 3GO instead of 3GO, especially in the case of using a diester plasticizer represented by the following formula (1) other than 3GO, or using triethylene glycol di-2-ethyl butyrate (3 GH) and triethylene glycol di-n-heptanoate (3G7), the ratio (G'(Tg+80)/G'(Tg+30)) is not greatly different from the ratio (G'(Tg+80)/G'(Tg+30)) in the case of using 3GO. Further, in the case that the amount of the plasticizer is 50 to 80 parts by weight for each 100 parts by weight of the polyvinyl acetal resin, the ratios (G'(Tg+80)/G'(Tg+30)) are not greatly different from each other. The ratio (G'(Tg+80)/G'(Tg+30)) measured using a resin film containing 100 parts by weight of a polyvinyl acetal resin and 60 parts by weight of triethylene glycol di-2-ethyl hexanoate (3GO) as a plasticizer is not greatly different from the ratio (G'(Tg+80)/G'(Tg+30)) measured using the first layer 2 itself. The ratios (G'(Tg+80)/G'(Tg+30)) obtained by the test method A and the test method B each are preferably 0.65 or higher, and it is more preferable that the ratio (G'(Tg+80)/G'(Tg+30)) obtained by the test method B is 0.65 or higher.

Also, in order to suppress bubble formation in the intermediate film for laminated glass, the polyvinyl acetal resin contained in the first layer 2 is preferably obtained by acetalization of a polyvinyl alcohol resin with an average degree of polymerization exceeding 3,000. In this case, the ratio (G'(Tg+80)/G'(Tg+30)) is not necessarily 0.65 or higher, but is preferably 0.65 or higher. From the viewpoint of further suppressing bubble formation and bubble growth in a laminated glass, the amount of the plasticizer is preferably 40 parts by weight or more for each 100 parts by weight of the polyvinyl acetal resin obtained by acetalizing a polyvinyl alcohol resin with an average degree of polymerization exceeding 3,000 in the first layer 2. In addition, from the viewpoint of further suppressing bubble formation and bubble growth in a laminated glass, the hydroxy group content is preferably 30 mol % or lower in the polyvinyl acetal resin obtained by acetalizing a polyvinyl alcohol resin with an average degree of polymerization exceeding 3,000 in the first layer 2.

From the viewpoint of further improving the sound-insulating property of a laminated glass, the amount of the plasticizer is preferably 40 parts by weight or more, more preferably 50 parts by weight or more, still more preferably 55 parts by weight or more, and particularly preferably 60 parts by weight or more, for each 100 parts by weight of the polyvinyl acetal resin in the first layer 2. Even in the case that the amount of the plasticizer is large in the first layer 2 as mentioned above, bubble formation and bubble growth in a laminated glass can be more effectively suppressed by controlling the hydroxy group contents in the polyvinyl acetal resins contained in the first layer, the second layer and the third layer as mentioned above, by controlling the proportion of the high-molecular-weight component X with an absolute molecular weight of 1,000,000 or higher or the proportion of the high-molecular-weight component Y with a molecular weight y of 1,000,000 or higher, or by controlling the ratio (G'(Tg+80)/G'(Tg+30)).

The following will describe the details of the first layer, the second layer and the third layer forming the intermediate film for laminated glass of the present invention and the details of the polyvinyl acetal resins and the plasticizers contained in the first layer, the second layer and the third layer.

(Thermoplastic Resin)

The polyvinyl acetal resin contained in the first layer (hereinafter, also referred to as a polyvinyl acetal resin (1)) is not particularly limited as long as the degree of acetylation (acetyl group amount) exceeds 30 mol %. The second layer preferably contains a thermoplastic resin, and more preferably contains a polyvinyl acetal resin (hereinafter, also referred to as a polyvinyl acetal resin (2)). The third layer preferably contains a thermoplastic resin, and more preferably contains a polyvinyl acetal resin (hereinafter, also referred to as a polyvinyl acetal resin (3)). If the thermoplastic resins contained in the second layer and the third layer are the polyvinyl acetal resin (2) and the polyvinyl acetal resin (3), the adhesive forces between the second layer and the third layer and the respective components of laminated glass become sufficiently high.

Examples of the thermoplastic resin include polyvinyl acetal resin, ethylene/vinyl acetate copolymerized resin, ethylene/acryl copolymerized resin, polyurethane resin, and polyvinyl alcohol resin. Thermoplastic resins other than these may be used.

The degree of acetylation of the polyvinyl acetal resin (1) exceeds 30 mol %. A preferable lower limit thereof is 30.5 mol %, a more preferable lower limit is 32 mol %, a still more preferable lower limit is 35 mol %, and a particularly preferable lower limit is 40 mol %, whereas a preferable upper limit is 90 mol %, a still more preferable upper limit is 80 mol %, a particularly preferable upper limit is 70 mol %, and a most preferable upper limit is 50 mol %. If the degree of acetylation is not lower than the lower limit, the sound-insulating property of an intermediate film and a laminated glass is high. As the degree of acetylation is not lower than the lower limit, the compatibility between the polyvinyl acetal resin (1) and the plasticizer may be high.

The degree of acetylation of each of the polyvinyl acetal resin (2) and the polyvinyl acetal resin (3) is preferably lower than the degree of acetylation of the polyvinyl acetal resin (1). As the degree of acetylation of each of the polyvinyl acetal resin (2) and the polyvinyl acetal resin (3) is lower than the degree of acetylation of the polyvinyl acetal resin (1), the penetration resistance of a laminated glass can be further improved.

The degree of acetylation of each of the polyvinyl acetal resin (2) and the polyvinyl acetal resin (3) is preferably 0 mol % or higher, more preferably 0.1 mol % or higher, and still more preferably 0.5 mol % or higher, whereas preferably 30 mol % or lower, more preferably 20 mol % or lower, still more preferably 10 mol % or lower, particularly preferably 5 mol % or lower, and most preferably 3 mol % or lower. If the degree of acetylation is not higher than the upper limit, the penetration resistance of an intermediate film and a laminated glass may be high. Further, if the degree of acetylation is not higher than the upper limit, bleed out of the plasticizer can be suppressed.

If the degree of acetylation of each of the polyvinyl acetal resin (2) and the polyvinyl acetal resin (3) is 3 mol % or lower, the mechanical properties of an intermediate film may be further improved. As a result, the penetration resistance of a laminated glass can be further improved.

The degree of acetylation is a value of mole fraction in terms of percentage (mol %) obtained by subtracting the amount of ethylene groups bonded with acetal groups and the amount of ethylene groups bonded with hydroxy groups from the total amount of ethylene groups in the main chain, and then dividing this value by the total amount of ethylene groups in the main chain. The amount of ethylene groups bonded with acetal groups can be measured in conformity with JIS K6728 "Testing Methods for Polyvinyl Butyral", for example.

The difference between the degree of acetylation of the polyvinyl acetal resin (1) and the degree of acetylation of the polyvinyl acetal resin (2), and the difference between the degree of acetylation of the polyvinyl acetal resin (1) and the degree of acetylation of the polyvinyl acetal resin (3) each are preferably 10 mol % or higher, and more preferably 20 mol % or higher, whereas preferably 50 mol % or lower, and more preferably 30 mol % or lower. If the difference between the degree of acetylation of the polyvinyl acetal resin (1) and that of each of the polyvinyl acetal resin (2) and the polyvinyl acetal resin (3) is not lower than the lower limit and not higher than the upper limit, the sound-insulating property and the penetration resistance of an intermediate film and a laminated glass can be further improved.

The polyvinyl acetal resin (1), polyvinyl acetal resin (2) and the polyvinyl acetal resin (3) can be produced by, for example, acetalizing polyvinyl alcohol with an aldehyde. The polyvinyl alcohol can be obtained by, for example, saponifying polyvinyl acetate. The degree of saponification of the polyvinyl alcohol is generally within a range of 70 to 99.9 mol %, and it is preferably within a range of 75 to 99.8 mol %, and more preferably 80 to 99.8 mol %.

The average degree of polymerization of the polyvinyl alcohol for obtaining each of the polyvinyl acetal resin (1), polyvinyl acetal resin (2) and the polyvinyl acetal resin (3) is preferably 200 or higher, more preferably 500 or higher, still more preferably 1,600 or higher, particularly preferably 2,600 or higher, and most preferably 2,700 or higher, whereas preferably 5,000 or lower, more preferably 4,000 or lower, and still more preferably 3,500 or lower. If the average degree of polymerization is not lower than the lower limit, the penetration resistance of a laminated glass can be further improved. If the average degree of polymerization is not higher than the upper limit, an intermediate film can be easily formed.

From the viewpoint of further improving the penetration resistance of a laminated glass, the average degree of polymerization of the polyvinyl alcohol is particularly preferably 2,700 or higher and 5,000 or lower.

From the viewpoint of further suppressing bubble formation and bubble growth in a laminated glass, with respect to the average degree of polymerization of the polyvinyl alcohol resin for obtaining the polyvinyl acetal resin (1) contained in the first layer, a preferable lower limit is 3,010, a preferable lower limit is 3,050, a preferable lower limit is 3,500, a preferable lower limit is 3,600, a preferable lower limit is 4,000, and a preferable lower limit is 4,050, whereas a preferable upper limit is 7,000, a preferable upper limit is 6,000, a preferable upper limit is 5,000, a preferable upper limit is 4,900, and a preferable upper limit is 4,500. In particular, because bubble formation and bubble growth in a laminated glass can be further suppressed, the sound-insulating property of a laminated glass can be sufficiently improved, and an intermediate film can be easily formed, the average degree of polymerization of the polyvinyl alcohol resin for obtaining the polyvinyl acetal resin (1) contained in the first layer is preferably 3,010 or higher, and more preferably 3,020 or higher, whereas preferably 4,000 or lower, more preferably lower than 4,000, still more preferably 3,800 or lower, particularly preferably 3,600 or lower, and most preferably 3,500 or lower.

The polyvinyl acetal resin (2) and the polyvinyl acetal resin (3) contained in the second layer and the third layer, respectively, can be produced by acetalizing a polyvinyl alcohol resin. With respect to the average degree of polymerization of the polyvinyl alcohol resin for obtaining the polyvinyl acetal resin (2) and the polyvinyl acetal resin (3) contained in the second layer and the third layer, a preferable lower limit is 200, a more preferable lower limit is 500, a still more preferable lower limit is 1,000, and a particularly preferable lower limit is 1,500, whereas a preferable upper limit is 4,000, a more preferable upper limit is 3,500, a still more preferable upper limit is 3,000, and a particularly preferable upper limit is 2,500. If the average degree of polymerization satisfies the above preferable lower limit, the penetration resistance of a laminated glass can be further improved. If the average degree of polymerization satisfies the above preferable upper limit, an intermediate film can be easily formed.

The average degree of polymerization of the polyvinyl alcohol resin for obtaining the polyvinyl acetal resin (1) contained in the first layer is preferably higher than the average degree of polymerization of the polyvinyl alcohol resin for obtaining the polyvinyl acetal resin (2) and the polyvinyl acetal resin (3) contained in the second layer and the third layer, preferably by 500 or higher, preferably by 800 or higher, more preferably by 1,000 or higher, still more preferably by 1,300 or higher, and particularly preferably 1,800 or higher.

The average degree of polymerization of the polyvinyl alcohol can be determined in conformity with JIS K6726 "Testing methods for polyvinyl alcohol".

The carbon number of the acetal group contained in the polyvinyl acetal resin is not particularly limited. The aldehyde to be used upon producing the polyvinyl acetal resin is not particularly limited. The carbon number of the acetal group in the polyvinyl acetal resin is preferably 3 to 5, and more preferably 3 or 4. If the carbon number of the acetal group in the polyvinyl acetal resin is 3 or greater, the glass transition temperature of an intermediate film is sufficiently low, so that the sound-insulating property against structure-borne sound at low temperatures can be further improved.

The aldehyde is not particularly limited. In general, a C1-C10 aldehyde is suitably used as the aforementioned aldehyde. Examples of the C1-C10 aldehyde include propionaldehyde, n-butyl aldehyde, isobutyl aldehyde, n-valeraldehyde, 2-ethylbutyl aldehyde, n-hexyl aldehyde, n-octyl aldehyde, n-nonyl aldehyde, n-decyl aldehyde, formaldehyde, acetaldehyde, and benzaldehyde. In particular, propionaldehyde, n-butyl aldehyde, isobutyl aldehyde, n-hexyl aldehyde, or n-valeraldehyde is preferable; propionaldehyde, n-butyl aldehyde, or isobutyl aldehyde is more preferable; and n-butyl aldehyde is still more preferable. Each of the aldehydes may be used alone, or two or more of these may be used in combination.

The polyvinyl acetal resin is preferably a polyvinyl butyral resin. The intermediate film for laminated glass of the present invention preferably contains a polyvinyl butyral resin as each of the polyvinyl acetal resins contained in the first layer, the second layer and the third layer. The polyvinyl butyral resin can be easily synthesized. Further, use of polyvinyl butyral resin allows an intermediate film to more suitably exert its adhesive force to components for laminated glass. In addition, properties such as the light resistance and weather resistance can be further improved.

The hydroxy group content (hydroxy group amount) in the polyvinyl acetal resin (1) is preferably 45 mol % or lower, more preferably 35 mol % or lower, still more preferably 30 mol % or lower, much more preferably 25 mol % or lower, particularly preferably 20 mol % or lower, and most preferably 15 mol % or lower. If the hydroxy group content is not higher than the upper limit, the sound-insulating property of a laminated glass can be further improved. In addition, the flexibility of an intermediate film can be improved and the intermediate film can be easily handled. From the viewpoint of further improving the sound-insulating property in a high frequency range of a laminated glass, the hydroxy group content in the polyvinyl acetal resin (1) is preferably as low as possible. The hydroxy group content in the polyvinyl acetal resin (1) can be 0 mol %.

The hydroxy group content (hydroxy group amount) in each of the polyvinyl acetal resin (2) and the polyvinyl acetal resin (3) is preferably higher than the hydroxy group content in the polyvinyl acetal resin (1). The hydroxy group content (hydroxy group amount) in each of the polyvinyl acetal resin (2) and the polyvinyl acetal resin (3) is preferably 20 mol % or higher, more preferably 25 mol % or higher, and still more preferably 30 mol % or higher, whereas preferably 50 mol % or lower, more preferably 45 mol % or lower, still more preferably 40 mol % or lower, and particularly preferably 35 mol % or lower. If the hydroxy group content is not lower than the lower limit, the penetration resistance of a laminated glass can be further improved. If the hydroxy group content is not higher than the upper limit, bleed out of a plasticizer is less likely to occur. In addition, the flexibility of an intermediate film can be improved and the intermediate film may be easily handled.

Each of the hydroxy group contents in the polyvinyl acetal resin (1), the polyvinyl acetal resin (2) and the polyvinyl acetal resin (3) is a value of mole fraction in terms of percentage (mol %) obtained by dividing the amount of ethylene groups bonded with hydroxy groups by the total amount of ethylene groups in the main chain. The amount of ethylene groups bonded with hydroxy groups can be determined by measuring the amount of ethylene groups bonded with the hydroxy groups in polyvinyl alcohol as a material in conformity with JIS K6726 "Testing Methods for Polyvinyl Alcohol", for example.

The degree of acetalization of the polyvinyl acetal resin (1) (in the case of polyvinyl butyral resin, degree of butyralization) is preferably 20 mol % or higher, more preferably 25 mol % or higher, and still more preferably 30 mol % or higher, whereas preferably 65 mol % or lower, more preferably 60 mol % or lower, and still more preferably 55 mol % or lower. If the degree of acetalization is not lower than the lower limit, the compatibility between the polyvinyl acetal resin (1) and the plasticizer can be improved, and bleed out of the plasticizer can be suppressed. If the degree of acetalization is not higher than the upper limit, the reaction time required for producing a polyvinyl acetal resin can be shortened.

The degree of acetalization of each of the polyvinyl acetal resin (2) and the polyvinyl acetal resin (3) (in the case of polyvinyl butyral resin, degree of butyralization) is preferably 55 mol % or higher, more preferably 60 mol % or higher, and still more preferably 63 mol % or higher, whereas preferably 85 mol % or lower, more preferably 75 mol % or lower, and still more preferably 70 mol % or lower. If the degree of acetalization is not lower than the lower limit, the compatibility between the polyvinyl acetal resin (2) and the polyvinyl acetal resin (3) and the plasticizer can be improved. If the degree of acetalization is not higher than the upper limit, the reaction time required for producing a polyvinyl acetal resin can be shortened.

The degree of acetalization is a value of mole fraction in terms of percentage (mol %) obtained by dividing the amount of ethylene groups bonded with acetal groups by the total amount of ethylene groups in the main chain.

The degree of acetalization can be calculated by measuring the degree of acetylation (degree of acetylation) and the hydroxy group content (vinyl alcohol amount), calculating the molar fractions thereof based on the obtained measurement results, and subtracting the degree of acetylation and the hydroxy group content from 100 mol %, according to the method in conformity with JIS K6728 "Testing Methods for Polyvinyl Butyral".

The degree of acetalization can be calculated by measuring the degree of acetylation (degree of acetylation) and the hydroxy group content (vinyl alcohol amount), calculating the molar fractions thereof based on the obtained measurement results, and subtracting the degree of acetylation and the hydroxy group content from 100 mol %, according to the method in conformity with JIS K6728 "Testing Methods for Polyvinyl Butyral".

In the case that the polyvinyl acetal resin is a polyvinyl butyral resin, the degree of acetalization (degree of butyralization) and the degree of acetylation can be calculated based on the measurement results according to the method in conformity with JIS K6728 "Testing Methods for Polyvinyl Butyral" or ASTM D1396-92. It is preferable to measure the values according to the method in conformity with ASTM D1396-92.

With respect to the weight average molecular weight of each of the polyvinyl acetal resin (1), the polyvinyl acetal resin (2) and the polyvinyl acetal resin (3), the lower limit thereof is preferably 100,000, and more preferably 300,000, whereas the upper limit thereof is preferably 10,000,000, and more preferably 5,000,000. If the weight average molecular weight of the polyvinyl acetal resin is not higher than the preferable lower limit, the strength of an intermediate film may be low. If the weight average molecular weight of the polyvinyl acetal resin exceeds the preferable upper limit, the strength of an intermediate film to be obtained may be too high. The weight average molecular weight herein indicates a weight average molecular weight in terms of polystyrene by gel permeation chromatography (GPC) measurement.

The aforementioned weight average molecular weight and number average molecular weight are a weight average molecular weight and a number average molecular weight in terms of polystyrene obtained by gel permeation chromatography (GPC) measurement. For example, in order to measure the weight average molecular weight and number average molecular weight in terms of polystyrene, polystyrene standard samples with known molecular weights are subjected to GPC measurement. As the polystyrene standard samples ("Shodex Standard SM-105", "Shodex Standard SH-75", SHOWA DENKO K.K.) are used 14 samples with the respective weight average molecular weights of 580, 1,260, 2,960, 5,000, 10,100, 21,000, 28,500, 76,600, 196,000, 630,000, 1,130,000, 2,190,000, 3,150,000, and 3,900,000. Molecular weights are plotted with respect to the corresponding elution times indicated by the peak tops of the peaks of the respective standard samples, and the obtained approximate straight line is used as a calibration curve. A multilayer intermediate film is left in a constant temperature and humidity facility (humidity: 30% (±3%), temperature: 23° C.) for one month, and then the surface layers (the second layer and the third layer) and the intermediate layer (the first layer) are separated. The separated first layer (intermediate layer) is dissolved in tetrahydrofuran (THF) to prepare a 0.1 wt % solution. The obtained solution is analyzed using a CPC device, and thereby the weight average molecular weight and the number average molecular weight are measured. The GPC device used for analyzing the weight average molecular weight and the number average molecular weight may be a GPC device (Hitachi High-Technologies Corp., RI: L2490, auto-sampler: L-2200, pump: L-2130, column oven: L-2350, columns: GL-A120-S and GL-A100MX-S in series) connected with a light scattering detector for GPC (VISCOTEK, Model 270 (RALS+VISCO)).

(Method of Producing Polyvinyl Acetal Resin Containing High-Molecular-Weight Component X with Absolute Molecular Weight of 1,000,000 or Higher or High-Molecular-Weight Component Y with Molecular Weight y of 1,000,000 or Higher)

The following will describe in detail the method of producing a polyvinyl acetal resin containing a high-molecular-weight component X with an absolute molecular weight of 1,000,000 or higher or a high-molecular-weight component Y with a molecular weight y of 1,000,000 or higher.

First, polyvinyl alcohol is prepared. The polyvinyl alcohol can be obtained by saponifying polyvinyl acetate, for example. The degree of saponification of the polyvinyl alcohol is usually within the range of 70 to 99.9 mol %, preferably within the range of 75 to 99.8 mol %, and more preferably within the range of 80 to 99.8 mol %.

With respect to the degree of polymerization of the polyvinyl alcohol, a preferable lower limit is 200, a more preferable lower limit is 500, a still more preferable lower limit is 1,000, and a particularly preferable lower limit is 1,500, whereas a preferable upper limit is 3,000, a more preferable upper limit is 2,900, a still more preferable upper limit is 2,800, and a particularly preferable upper limit is 2,700. If the degree of polymerization is too low, the penetration resistance of a laminated glass tends to be low. If the degree of polymerization is too high, it may be difficult to form an intermediate film.

Next, the polyvinyl alcohol and an aldehyde are reacted using a catalyst, and thereby the polyvinyl alcohol is acetalized. At this time, a solution containing the polyvinyl alcohol may be used. Examples of the solvent used for the solution containing the polyvinyl alcohol include water.

The method for producing the polyvinyl acetal resin contained in the first layer is preferably a production method in which the polyvinyl alcohol and an aldehyde are reacted using a catalyst so that the polyvinyl alcohol is acetalized, and thereby a polyvinyl acetal resin is obtained.

The method of producing the first layer preferably comprises a step of preparing a polyvinyl acetal resin by reacting a polyvinyl alcohol and an aldehyde using a catalyst so that the polyvinyl alcohol is acetalized, and a step of preparing the first layer using a mixture of the obtained polyvinyl acetal resin and a plasticizer. In this step of preparing the first layer, or after the first layer is obtained, a multilayer intermediate film can be obtained by laminating a second layer and, if necessary, laminating a third layer, on the first layer. Alternatively, a multilayer intermediate film can be produced by co-extruding the first layer and the second layer, or a multilayer intermediate film can be produced by co-extruding the first layer, the second layer, and the third layer.

The aldehyde is not particularly limited. A suitable aldehyde is commonly a C1-C10 aldehyde. Examples of the C1-C10 aldehyde include propionaldehyde, n-butyl aldehyde, isobutyl aldehyde, n-valeraldehyde, 2-ethylbutyl aldehyde, n-hexyl aldehyde, n-octyl aldehyde, n-nonyl aldehyde, n-decyl aldehyde, formaldehyde, acetaldehyde, and benzaldehyde. In particular, n-butyl aldehyde, n-hexyl aldehyde, or n-valeraldehyde is preferable, and n-butyl aldehyde is more preferable. Each of the aldehydes may be used alone, or two or more of these may be used in combination.

From the viewpoint of easily obtaining a polyvinyl acetal resin containing high-molecular-weight component X with an absolute molecular weight of 1,000,000 or higher or high-molecular-weight component Y with a molecular weight y of 1,000,000 or higher in the aforementioned specific ratio, for example, the following methods can be exemplified: a method of adding a cross-linker such as dialdehyde for cross-linking the main chains of adjacent polyvinyl alcohols before or in the middle of the acetalizing reaction with an aldehyde; a method of adding an excessive amount of aldehyde to proceed the acetalizing reaction between the molecules; and a method of adding a polyvinyl alcohol with a high degree of polymerization. Each of these methods may be used alone, or two or more of these may be used in combination.

The catalyst is preferably an acid catalyst. Examples of the acid catalyst include nitric acid, hydrochloric acid, sulfuric acid, phosphoric acid, and para-toluenesulfonic acid.

The molecular weight in terms of polystyrene is a molecular weight in terms of polystyrene by gel permeation chromatography (GPC) measurement. The proportion (%) of the high-molecular-weight component Y with a molecular weight y of 1,000,000 or higher in the polyvinyl acetal resin is calculated from the ratio of the area corresponding to a region where the molecular weight y is 1,000,000 or higher among the peak area detected by an RI detector upon measuring the molecular weight in terms of polystyrene by GPC on the polyvinyl acetal resin. The peak area means an area between the peak and the baseline of the component to be measured.

The molecular weight in terms of polystyrene can be measured as follows, for example.

In order to measure the molecular weight in terms of polystyrene standard, polystyrene standard samples with known molecular weights are subjected to GPC measurement. As the polystyrene standard samples ("Shodex Standard SM-105", "Shodex Standard SH-75", SHOWA DENKO K.K.) are used 14 samples with the respective weight average molecular weights of 580, 1,260, 2,960, 5,000, 10,100, 21,000, 28,500, 76,600, 196,000, 630,000, 1,130,000, 2,190,000, 3,150,000, and 3,900,000. Weight average molecular weights are plotted with respect to the corresponding elution times indicated by the peak tops of the peaks of the respective standard samples, and the obtained approximate straight line is used as a calibration curve. In the case of measuring the proportion (%) of the high-molecular-weight component Y with the molecular weight y of 1,000,000 or higher in the polyvinyl acetal resin contained in the intermediate layer in a multilayer intermediate film having a surface layer, the intermediate layer, and a surface layer laminated in the stated order, for example, the multilayer intermediate film is left in a constant temperature and humidity facility (humidity: 30% (±3%), temperature: 23° C.) for one month, and then the surface layers and the intermediate layer are separated. The separated intermediate layer is dissolved in tetrahydrofuran (THF) to prepare a 0.1 wt % solution. The obtained solution is analyzed using a GPC device, and thereby the peak area of the polyvinyl acetal resin in the intermediate layer is measured. Next, based on the elution time and the calibration curve of the polyvinyl acetal resin contained in the intermediate layer, the area corresponding to a region where the molecular weight in terms of polystyrene of the polyvinyl acetal resin contained in the intermediate layer is 1,000,000 or higher is calculated. By representing in percentage (%) a value obtained by dividing the area corresponding to a region where the molecular weight in terms of polystyrene of the polyvinyl acetal resin contained in the intermediate layer is 1,000,000 or higher by the peak area of the polyvinyl acetal resin contained in the intermediate layer, the proportion (%) of the high-molecular-weight component Y with the molecular weight y of 1,000,000 or higher in the polyvinyl acetal resin can be calculated. For example, the molecular weight in terms of polystyrene can be measured using a gel permeation chromatography (GPC) device (Hitachi High-Technologies Corp., RI: L2490, auto-sampler: L-2200, pump: L-2130, column oven: L-2350, columns: GL-A120-S and GL-A100MX-S in series).

(Plasticizer)

The first layer contains a plasticizer (hereinafter, also referred to as a plasticizer (1)). The second layer preferably contains a plasticizer (hereinafter, also referred to as a plasticizer (2)). The third layer preferably contains a plasticizer (hereinafter, also referred to as a plasticizer (3)). The plasticizer (1), the plasticizer (2) and the plasticizer (3) contained in the first layer, the second layer and the third layer are not particularly limited. Conventionally known plasticizers can be used as the plasticizer (1), the plasticizer (2) and the plasticizer (3). Each of the plasticizer (1), the plasticizer (2) and the plasticizer (3) may be used alone, or two or more of these may be used in combination.

Examples of the plasticizer (1), the plasticizer (2) and the plasticizer (3) include organic ester plasticizers such as monobasic organic acid esters and polybasic organic acid esters, and phosphate plasticizers such as organophosphate plasticizers and organophosphite plasticizers. Preferable among these are organic ester plasticizers. The plasticizers are preferably liquid plasticizers.

The monobasic organic acid esters are not particularly limited. Examples thereof include glycol esters obtainable by reaction of a glycol and a monobasic organic acid, and esters of triethylene glycol or tripropylene glycol and a monobasic organic acid. Examples of the glycol include triethylene glycol, tetraethylene glycol, and tripropylene glycol. Examples of the monobasic organic acid include butyric acid, isobutyric acid, caproic acid, 2-ethylbutyric acid, heptanoic acid, n-octylic acid, 2-ethylhexylic acid, n-nonylic acid, and decylic acid.

The polybasic organic acid esters are not particularly limited. Examples thereof include ester compounds of a polybasic organic acid and a C4-C8 linear or branched alcohol. Examples of the polybasic organic acid include adipic acid, sebacic acid, and azelaic acid.

The organic ester plasticizers are not particularly limited. Examples thereof include triethylene glycol di-2-ethyl butyrate, triethylene glycol di-2-ethyl hexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethyl butyrate, 1,3-propylene glycol di-2-ethyl butyrate, 1,4-butyrene glycol di-2-ethyl butyrate, diethylene glycol di-2-ethyl butyrate, diethylene glycol di-2-ethyl hexanoate, dipropylene glycol di-2-ethyl butyrate, triethylene glycol di-2-ethyl pentanoate, tetraethylene glycol di-2-ethyl butyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptylnonyl adipate, dibutyl sebacate, oil-modified alkyd sebacate, and a mixture of a phosphate and an adipate. Organic ester plasticizers other than these may also be used.

The organophosphate plasticizers are not particularly limited. Examples thereof include tributoxyethyl phosphate, isodecylphenyl phosphate, and triisopropyl phosphate.

The plasticizer (1), the plasticizer (2) and the plasticizer (3) each are preferably a diester plasticizer represented by the following formula (1).

[Chem. 1]

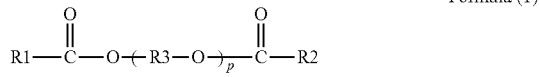

Formula (1)

In the formula (1), R1 and R2 each represent a C3-C10 organic group; R3 represents an ethylene group, an isopropylene group, or an n-propylene group; and p is an integer of 3 to 10. In the formula (1), R1 and R2 each are preferably a C5-C10 alkyl group.

The plasticizers preferably include at least one of triethylene glycol di-2-ethyl hexanoate (3GO), triethylene glycol dibutyrate (3GB), dibutyl adipate, and triethylene glycol di-2-ethyl butyrate (3GH), and more preferably include triethylene glycol di-2-ethyl hexanoate or triethylene glycol dibutyrate.

In the first layer, the amount of the plasticizer (1) is preferably 25 to 60 parts by weight for each 100 parts by weight of the polyvinyl acetal resin (1). The amount of the plasticizer (1) for each 100 parts by weight of the polyvinyl acetal resin (1) is more preferably 30 parts by weight or more, and still more preferably 40 parts by weight or more, whereas more preferably 55 parts by weight or less, and still more preferably 50 parts by weight or less. If the amount of the plasticizer (1) is not lower than the lower limit, the flexibility of an intermediate film may be high, and thereby the intermediate film can be easily handled. If the amount of the plasticizer (1) is not higher than the upper limit, the transparency of an intermediate film can be higher.

In the second layer (2), the amount of the plasticizer (2) is preferably 15 to 45 parts by weight for each 100 parts by weight of the polyvinyl acetal resin (2). In addition, in the third layer (3), the amount of the plasticizer (3) is preferably 15 to 45 parts by weight for each 100 parts by weight of the polyvinyl acetal resin (3). The amount of each of the plasticizer (2) and the plasticizer (3) for each 100 parts by weight of the polyvinyl acetal resin (2) and the polyvinyl acetal resin (3) is more preferably 20 parts by weight or more, whereas more preferably 40 parts by weight or less. If each of the amounts of the plasticizer (2) and the plasticizer (3) is not lower than the lower limit, the flexibility of an intermediate film may be high, and thereby the intermediate film can be easily handled. If each of the amounts of the plasticizer (2) and the plasticizer (3) is not higher than the upper limit, the penetration resistance of an intermediate film can be higher.

The amount of the plasticizer (2) (hereinafter, also referred to as an amount (2)) for each 100 parts by weight of the polyvinyl acetal resin (2) in the second layer is preferably less than the amount of the plasticizer (1) (hereinafter, also referred to as an amount (1)) for each 100 parts by weight of the polyvinyl acetal resin (1) in the first layer. Also, the amount of the plasticizer (3) (hereinafter, also referred to as an amount (3)) for each 100 parts by weight of the polyvinyl acetal resin (3) in the third layer is preferably less than the amount of the plasticizer (1) (hereinafter, also referred to as an amount (1)) for each 100 parts by weight of the polyvinyl acetal resin (1) in the first layer. As the amount (2) and the amount (3) each are less than the amount (1), the penetration resistance of a laminated glass can be higher.

With respect to the difference between the amount (1) and each of the amount (2) and the amount (3), a preferable lower limit is 1 part by weight, a more preferable lower limit is 5 parts by weight, a still more preferable lower limit is 10 parts by weight, a particularly preferable lower limit is 15 parts by weight, and a most preferable lower limit is 20 parts by weight, whereas a preferable upper limit is 40 parts by weight, a more preferable upper limit is 35 parts by weight, a still more preferable upper limit is 30 parts by weight, and a particularly preferable upper limit is 25 parts by weight. If the difference between the amount (1) and each of the amount (2) and the amount (3) is not lower than the lower limit, the sound-insulating property of a laminated glass can be higher, whereas if the difference is not higher than the upper limit, the penetration resistance of a laminated glass can be higher. The difference between the amount (1) and each of the amount (2) and the amount (3) is a value obtained by subtracting either the amount (2) or the amount (3) from the amount (1).

(Other Components)

The intermediate film for laminated glass of the present invention may contain additives such as an ultraviolet absorber, an antioxidant, a photostabilizer, a flame retardant, an antistatic agent, pigments, dyes, adhesiveness adjuster, an anti-humidity agent, a fluorescent brightener, and an infrared radiation absorber, if necessary. Each of these additives may be used alone, or two or more additives may be used in combination.

(Intermediate Film for Laminated Glass)

The thickness of the first layer is preferably within a range of 0.02 to 1.8 mm. The thickness of the first layer is more preferably 0.05 mm or higher, and still more preferably 0.08 mm or higher, whereas more preferably 0.5 mm or lower, and still more preferably 0.15 mm or lower. As the first layer has such a preferable thickness, an intermediate film may not be too thick, and the sound-insulating property of the intermediate film and a laminated glass can be further improved.

The thicknesses of the second layer and the third layer each are preferably within a range of 0.1 to 1 mm. The thicknesses of the second layer and the third layer each are more preferably 0.2 mm or higher, and still more preferably 0.3 mm or higher, whereas more preferably 0.5 mm or lower, and still more preferably 0.4 mm or lower. If the thicknesses of the second layer and the third layer each are not lower than the lower limit and not higher than the upper limit, an intermediate film may not be too thick, the sound-insulating property of the intermediate film and a laminated glass can be further improved, and bleed out of the plasticizers can be suppressed.

In the case that the intermediate film has a laminated structure of two or more layers, as the ratio of the thickness of the first layer to the thickness of the intermediate film ((thickness of first layer)/(thickness of intermediate film)) is smaller and the amount of the plasticizer contained in the first layer is larger, bubble formation and bubble growth in a laminated glass is more likely to occur and the bubbles are more likely to grow. Particularly in the case that the ratio in the intermediate film is 0.05 or higher and 0.35 or lower, bubble formation and bubble growth in a laminated glass can be sufficiently suppressed and the sound-insulating property of a laminated glass can be further improved even though the amount of the plasticizer for each 100 parts by weight of the polyvinyl acetal resin is large in the first layer.

The ratio ((thickness of first layer)/(thickness of intermediate film)) is preferably 0.06 or higher, more preferably 0.07 or higher, still more preferably 0.08 or higher, and particularly preferably 0.1 or higher, whereas preferably 0.3 or lower, more preferably 0.25 or lower, still more preferably 0.2 or lower, and particularly preferably 0.15 or lower.

The thickness of the intermediate film for laminated glass of the present invention is preferably within a range of 0.1 to 3 mm. The thickness of the intermediate film is more preferably 0.25 mm or higher, whereas more preferably 1.5 mm or lower. If the thickness of the intermediate film is not lower than the lower limit, the penetration resistance of the intermediate film and a laminated glass may be sufficiently high. If the thickness of the intermediate film is not higher than the upper limit, the transparency of an intermediate film may be better.

The method for producing the intermediate film for laminated glass of the present invention is not particularly limited. Any conventionally known method may be used as the method for producing the intermediate film. For example, a polyvinyl acetal resin and a plasticizer, and other components added as appropriate are kneaded, and then the kneaded product is formed into an intermediate film. A production method including extrusion-molding is preferable because such a method is suitable for continuous production.

The kneading method is not particularly limited. For example, a method using an extruder, a plastograph, a kneader, a Banbury mixer, or a calender roll may be applied. Preferable among these is a method using an extruder, and a method using a twin-screw extruder is more suitable because it is suitable for continuous production. With respect to the intermediate film for laminated glass of the present invention, the first layer, the second layer and the third layer may be separately produced, and then laminated to provide a multilayer intermediate film, or the first layer, the second layer and the third layer may be laminated by co-extrusion to provide an intermediate film.

Because the producibility of the intermediate film is excellent, the second layer and the third layer preferably contain the same polyvinyl acetal resin; the second layer and the third layer more preferably contain the same polyvinyl acetal resin and the same plasticizer; and the second layer and the third layer are still more preferably formed from the same resin composition.

(Laminated Glass)

Figure 2:
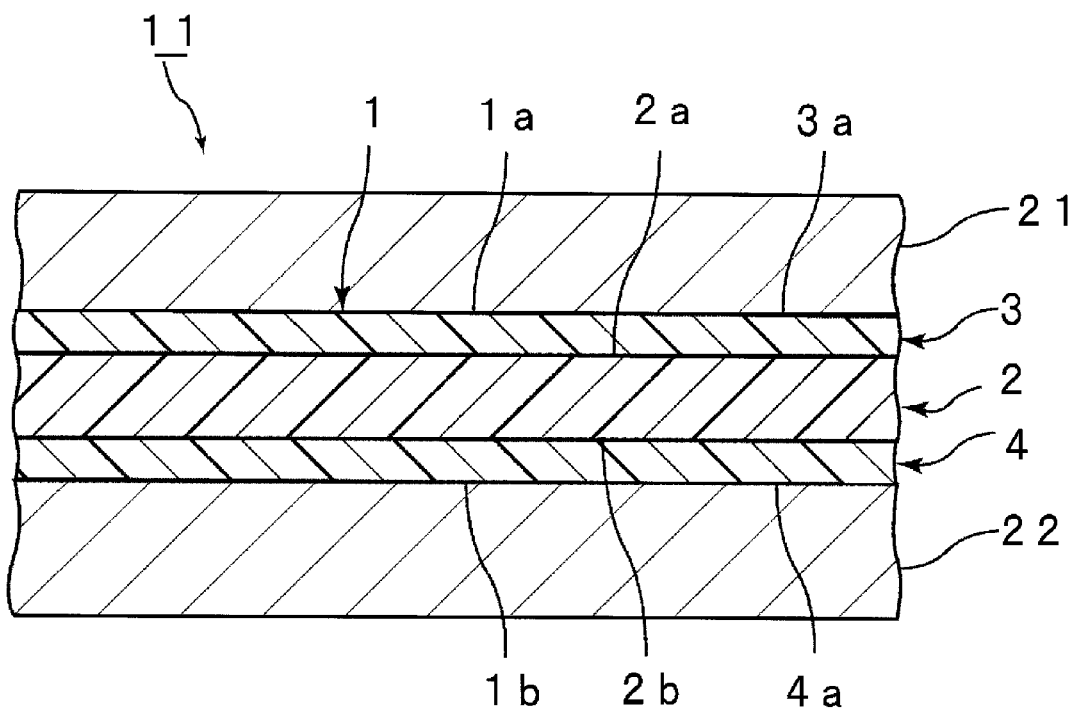
FIG. 2 is a partially cut cross-sectional view schematically showing one example of a laminated glass using the intermediate film for laminated glass shown in FIG. 1.

FIG. 2 is a cross-sectional view showing one example of a laminated glass using the intermediate film for laminated glass according to one embodiment of the present invention.

A laminated glass 11 shown in FIG. 2 comprises an intermediate film 1, a first component for laminated glass 21 and a second component for laminated glass 22. The intermediate film 1 is sandwiched between the first component for laminated glass 21 and the second component for laminated glass 22. The component for laminated glass 21 is laminated on a first surface 1a of the intermediate film 1. The component for laminated glass 22 is laminated on a second surface 1b opposite to the first surface 1a of the intermediate film 1. The first component for laminated glass 21 is laminated on an outer surface 3a of the second layer 3. The second component for laminated glass 22 is laminated on an outer surface 4a of the third layer 4.

As mentioned above, the laminated glass of the present invention comprises a first component for laminated glass, a second component for laminated glass, and an intermediate film sandwiched between the first component for laminated glass and the second component for laminated glass, wherein the intermediate film is the intermediate film for laminated glass of the present invention.

Examples of the first component for laminated glass and the second component for laminated glass include glass plates and PET (polyethylene terephthalate) films. The laminated glass includes not only a laminated glass in which an intermediate film is sandwiched between two glass plates, but also a laminated glass in which an intermediate film is sandwiched between a glass plate and a PET film, for example. The laminated glass is a laminate comprising a glass plate, and at least one glass plate is preferably used.

Examples of the glass plate include inorganic glass and organic glass. Examples of the inorganic glass include float plate glass, heat-absorbing plate glass, heat-reflective plate glass, polished plate glass, patterned glass, wired glass, linear-wired glass and green-tinted glass. The organic glass is synthetic resin glass used instead of inorganic glass. Examples of the organic glass include polycarbonate plates and poly(meth)acryl resin plates. Examples of the poly(meth)acryl resin plate include polymethyl(meth)acrylate plates.

The thickness of each of the first component for laminated glass and the second component for laminated glass is not particularly limited, and it is preferably within a range of 1 to 5 mm. In the case that the component for laminated glass is a glass plate, the thickness of the glass plate is preferably within a range of 1 to 5 mm. In the case that the component for laminated glass is a PET film, the thickness of the PET film is preferably within a range of 0.03 to 0.5 mm.

The method for producing the laminated glass is not particularly limited. For example, the intermediate film is sandwiched between the first component for laminated glass and the second component for laminated glass, and then passed through a press roll or put into a rubber bag and decompression-sucked, so that the air remained between the first component for laminated glass and the second component for laminated glass and the intermediate film is removed. Thereafter, the workpiece is pre-bonded at about 70° C. to 110° C. so that a laminate is provided. Next, the laminate is put into an autoclave or pressed so that the laminate is press-bonded at about 120° C. to 150° C. and a pressure of 1 to 1.5 MPa, and thereby a laminated glass is obtained.

The laminated glass can be used for automobiles, railway carriages, aircrafts, ships, buildings, and the like. The laminated glass can also be used for other applications. The intermediate film is preferably an intermediate film for buildings or vehicles, and more preferably for vehicles. The laminated glass is preferably a laminated glass for buildings or vehicles, and more preferably for vehicles. The intermediate film and the laminated glass can be suitably used for electric vehicles using electric motors and hybrid electric vehicles using internal-combustion engines and electric motors. The laminated glass can be used for windshields, side glasses, rear glasses, and roof glasses of automobiles.

The following will describe the present invention in detail referring to, but not limited to, examples.

In the examples and comparative examples, the following polyvinyl butyral resins (polyvinyl acetal resins) were used. The degree of butyralization (degree of acetalization), the degree of acetylation, and the hydroxy group content of each polyvinyl butyral resin were measured by the method in conformity with ASTM D1396-92. Also, in the case of measuring the values in conformity with JIS K6728 "Testing Methods for Polyvinyl Butyral", the same values were indicated as in the method in conformity with ASTM D1396-92.

Synthesis Example 1

Synthesis of Polyvinyl Butyral Resin a

A polyvinyl butyral resin (average degree of polymerization: 3,000) having a degree of acetylation of 0.5 mol %, a degree of butyralization of 40 mol %, and a hydroxy group content of 59.5 mol % was dissolved in pyridine. To the dissolved polyvinyl butyral resin was added 30 mol equivalents of acetic anhydride, and the mixture was stirred at 80° C. for 120 minutes. The pyridine was removed, and then the polyvinyl butyral resin was washed with water and dried. Thereby, a polyvinyl butyral resin a (average degree of polymerization: 3,000) was obtained. With respect to the obtained polyvinyl butyral resin a, the degree of acetylation was 30.5 mol %, the degree of butyralization was 40 mol %, and the hydroxy group content was 29.5 mol %.

Synthesis Example 2

Synthesis of Polyvinyl Butyral Resin b

A polyvinyl butyral resin (average degree of polymerization: 3,000) having a degree of acetylation of 0.5 mol %, a degree of butyralization of 35 mol %, and a hydroxy group content of 64.5 mol % was dissolved in pyridine. To the dissolved polyvinyl butyral resin was added 39.5 mol equivalents of acetic anhydride, and the mixture was stirred at 80° C. for 120 minutes. The pyridine was removed, and then the polyvinyl butyral resin was washed with water and dried. Thereby, a polyvinyl butyral resin b (average degree of polymerization: 3,000) was obtained. With respect to the obtained polyvinyl butyral resin b, the degree of acetylation was 40 mol %, the degree of butyralization was 35 mol %, and the hydroxy group content was 25 mol %.

Synthesis Example 3

Synthesis of Polyvinyl Butyral Resin c

A polyvinyl butyral resin (average degree of polymerization: 3,000) having a degree of acetylation of 0.5 mol %, a degree of butyralization of 25 mol %, and a hydroxy group content of 74.5 mol % was dissolved in pyridine. To the dissolved polyvinyl butyral resin was added 49.5 mol equivalents of acetic anhydride, and the mixture was stirred at 80° C. for 120 minutes. The pyridine was removed, and then the polyvinyl butyral resin was washed with water and dried. Thereby, a polyvinyl butyral resin c (average degree of polymerization: 3,000) was obtained. With respect to the obtained polyvinyl butyral resin c, the degree of acetylation was 50 mol %, the degree of butyralization was 25 mol %, and the hydroxy group content was 25 mol %.

Synthesis Example 4

Synthesis of Polyvinyl Butyral Resin d

To 2,910 g of pure water was added 190 g of polyvinyl alcohol with a degree of polymerization of 1,700, and then the mixture was heated so that the polyvinyl alcohol was dissolved into the pure water. The temperature of the solution was controlled to 12° C. To the solution were added 201 g of 35 wt % hydrochloric acid and 134 g of n-butyl aldehyde, and a polyvinyl butyral resin was precipitated. Thereafter, the reaction system was kept at 50° C. for 4 hours, and the reaction was finished. The resin was washed with excess water so that unreacted n-butyl aldehyde was washed away. Further, the hydrochloric acid catalyst was neutralized and the salt was removed, and then the product was dried. Thereby, a polyvinyl butyral resin d was obtained. With respect to the obtained polyvinyl butyral resin d, the degree of acetylation was 1 mol %, the degree of butyralization was 68.5 mol %, and the hydroxy group content was 30.5 mol %.

Synthesis Example 5

Synthesis of Polyvinyl Butyral Resin e

To 2,890 g of pure water was added 191 g of polyvinyl alcohol with a degree of polymerization of 3,000, and then the mixture was heated so that the polyvinyl alcohol was dissolved into the pure water. The temperature of the solution was controlled to 12° C. To the solution were added 201 g of 35 wt % hydrochloric acid and 150 g of n-butyl aldehyde, and a polyvinyl butyral resin was precipitated. Thereafter, the reaction system was kept at 50° C. for 5 hours, and the reaction was finished. The resin was washed with excess water so that unreacted n-butyl aldehyde was washed away. Further, the hydrochloric acid catalyst was neutralized and the salt was removed, and then the product was dried. Thereby, a polyvinyl butyral resin e was obtained. With respect to the obtained polyvinyl butyral resin e, the degree of acetylation was 12.8 mol %, the degree of butyralization was 63.5 mol %, and the hydroxy group content was 23.7 mol %.

Synthesis Example 6

Synthesis of Polyvinyl Butyral Resin f

A polyvinyl butyral resin (average degree of polymerization: 3,000) having a degree of acetylation of 13 mol %, a degree of butyralization of 59 mol %, and a hydroxy group content of 28 mol % was dissolved in pyridine. To the dissolved polyvinyl butyral resin was added 22 mol equivalents of acetic anhydride, and the mixture was stirred at 80° C. for 120 minutes. The pyridine was removed, and then the polyvinyl butyral resin was washed with water and dried. Thereby, a polyvinyl butyral resin f was obtained. With respect to the obtained polyvinyl butyral resin f, the degree of acetylation was 35 mol %, the degree of butyralization was 59 mol %, and the hydroxy group content was 6 mol %.

Synthesis Example 7

Synthesis of Polyvinyl Butyral Resin g

A polyvinyl butyral resin (average degree of polymerization: 3,000) having a degree of acetylation of 20 mol %, a degree of butyralization of 45 mol %, and a hydroxy group content of 35 mol % was dissolved in pyridine. To the dissolved polyvinyl butyral resin was added 20 mol equivalents of acetic anhydride, and the mixture was stirred at 80° C. for 120 minutes. The pyridine was removed, and then the polyvinyl butyral resin was washed with water and dried. Thereby, a polyvinyl butyral resin g was obtained. With respect to the obtained polyvinyl butyral resin g, the degree of acetylation was 40 mol %, the degree of butyralization was 45 mol %, and the hydroxy group content was 15 mol %.

Synthesis Example 8

Synthesis of Polyvinyl Butyral Resin h

A blended product (weight ratio is 1:1) of a polyvinyl butyral resin (average degree of polymerization: 2,800) with a degree of acetylation of 20 mol %, a degree of butyralization of 58 mol %, and a hydroxy group content of 22 mol % and a polyvinyl butyral resin (average degree of polymerization: 4,000) with a degree of acetylation of 20 mol %, a degree of butyralization of 58 mol %, and a hydroxy group content of 22 mol % was dissolved in pyridine. To the dissolved polyvinyl butyral resins was added 15 mol equivalents of acetic anhydride, and the mixture was stirred at 80° C. for 120 minutes. The pyridine was removed, and then the polyvinyl butyral resin was washed with water and dried. Thereby, a polyvinyl butyral resin h was obtained. With respect to the obtained polyvinyl butyral resin h, the degree of acetylation was 35 mol %, the degree of butyralization was 58 mol %, and the hydroxy group content was 7 mol %. The proportion of the high-molecular-weight component X (polyvinyl butyral resin) with an absolute molecular weight of 1,000,000 or higher was 19.6% in the obtained polyvinyl butyral resin. The proportion of the high-molecular-weight component Y (polyvinyl butyral resin) with a molecular weight y of 1,000,000 or higher was 23.1% in the obtained polyvinyl butyral resin Z.

Synthesis Example 9

Synthesis of Polyvinyl Butyral Resin i

A polyvinyl butyral resin (average degree of polymerization: 3,050) having a degree of acetylation of 20 mol %, a degree of butyralization of 26 mol %, and a hydroxy group content of 54 mol % was dissolved in pyridine. To the dissolved polyvinyl butyral resin was added 47 mol equivalents of acetic anhydride, and the mixture was stirred at 80° C. for 120 minutes. The pyridine was removed, and then the polyvinyl butyral resin was washed with water and dried. Thereby, a polyvinyl butyral resin i was obtained. With respect to the obtained polyvinyl butyral resin i, the degree of acetylation was 67 mol %, the degree of butyralization was 26 mol %, and the hydroxy group content was 7 mol %.

Synthesis Example 10

Synthesis of Polyvinyl Butyral Resin j

A polyvinyl butyral resin (average degree of polymerization: 3,050) having a degree of acetylation of 30 mol %, a degree of butyralization of 13 mol %, and a hydroxy group content of 57 mol % was dissolved in pyridine. To the dissolved polyvinyl butyral resin was added 50 mol equivalents of acetic anhydride, and the mixture was stirred at 80° C. for 120 minutes. The pyridine was removed, and then the polyvinyl butyral resin was washed with water and dried. Thereby, a polyvinyl butyral resin j was obtained. With respect to the obtained polyvinyl butyral resin j, the degree of acetylation was 80 mol %, the degree of butyralization was 13 mol %, and the hydroxy group content was 7 mol %.

Synthesis Example 11

Synthesis of Polyvinyl Butyral Resin k

A polyvinyl butyral resin (average degree of polymerization: 3,200) having a degree of acetylation of 20 mol %, a degree of butyralization of 58 mol %, and a hydroxy group content of 22 mol % was dissolved in pyridine. To the dissolved polyvinyl butyral resin was added 20 mol equivalents of acetic anhydride, and the mixture was stirred at 80° C. for 120 minutes. The pyridine was removed, and then the polyvinyl butyral resin was washed with water and dried. Thereby, a polyvinyl butyral resin k was obtained. With respect to the obtained polyvinyl butyral resin k, the degree of acetylation was 40 mol %, the degree of butyralization was 58 mol %, and the hydroxy group content was 2 mol %.

Synthesis Example 12

Synthesis of Polyvinyl Butyral Resin l

A polyvinyl butyral resin (average degree of polymerization: 3,200) having a degree of acetylation of 20 mol %, a degree of butyralization of 52 mol %, and a hydroxy group content of 28 mol % was dissolved in pyridine. To the dissolved polyvinyl butyral resin was added 12 mol equivalents of acetic anhydride, and the mixture was stirred at 80° C. for 120 minutes. The pyridine was removed, and then the polyvinyl butyral resin was washed with water and dried. Thereby, a polyvinyl butyral resin l was obtained. With respect to the obtained polyvinyl butyral resin l, the degree of acetylation was 32 mol %, the degree of butyralization was 52 mol %, and the hydroxy group content was 16 mol %.

Synthesis Example 13

Synthesis of Polyvinyl Butyral Resin m

A polyvinyl butyral resin (average degree of polymerization: 3,200) having a degree of acetylation of 20 mol %, a degree of butyralization of 50 mol %, and a hydroxy group content of 30 mol % was dissolved in pyridine. To the dissolved polyvinyl butyral resin was added 10.5 mol equivalents of acetic anhydride, and the mixture was stirred at 80° C. for 120 minutes. The pyridine was removed, and then the polyvinyl butyral resin was washed with water and dried. Thereby, a polyvinyl butyral resin m was obtained. With respect to the obtained polyvinyl butyral resin m, the degree of acetylation was 30.5 mol %, the degree of butyralization was 50 mol %, and the hydroxy group content was 19.5 mol %.

Synthesis Example 14

Synthesis of Polyvinyl Butyral Resin n

A polyvinyl butyral resin (average degree of polymerization: 3,200) having a degree of acetylation of 20 mol %, a degree of butyralization of 55 mol %, and a hydroxy group content of 25 mol % was dissolved in pyridine. To the dissolved polyvinyl butyral resin was added 10.5 mol equivalents of acetic anhydride, and the mixture was stirred at 80° C. for 120 minutes. The pyridine was removed, and then the polyvinyl butyral resin was washed with water and dried. Thereby, a polyvinyl butyral resin n was obtained. With respect to the obtained polyvinyl butyral resin n, the degree of acetylation was 30.5 mol %, the degree of butyralization was 55 mol %, and the hydroxy group content was 14.5 mol %.

Synthesis Example 15

Synthesis of Polyvinyl Butyral Resin q

A polyvinyl butyral resin (average degree of polymerization: 3,000) having a degree of acetylation of 10 mol %, a degree of butyralization of 65 mol %, and a hydroxy group content of 25 mol % was dissolved in pyridine. To the dissolved polyvinyl butyral resin was added 20.5 mol equivalents of acetic anhydride, and the mixture was stirred at 80° C. for 120 minutes. The pyridine was removed, and then the polyvinyl butyral resin was washed with water and dried. Thereby, a polyvinyl butyral resin q was obtained. With respect to the obtained polyvinyl butyral resin q, the degree of acetylation was 30.5 mol %, the degree of butyralization was 65 mol %, and the hydroxy group content was 4.5 mol %.

Synthesis Example 16

Synthesis of Polyvinyl Butyral Resin r

A polyvinyl butyral resin (average degree of polymerization: 3,200) having a degree of acetylation of 30 mol %, a degree of butyralization of 45 mol %, and a hydroxy group content of 25 mol % was dissolved in pyridine. To the dissolved polyvinyl butyral resin was added 10 mol equivalents of acetic anhydride, and the mixture was stirred at 80° C. for 120 minutes. The pyridine was removed, and then the polyvinyl butyral resin was washed with water and dried. Thereby, a polyvinyl butyral resin r was obtained. With respect to the obtained polyvinyl butyral resin r, the degree of acetylation was 40 mol %, the degree of butyralization was 45 mol %, and the hydroxy group content was 15 mol %.

Synthesis Example 17

Synthesis of Polyvinyl Butyral Resin t

A polyvinyl butyral resin (average degree of polymerization: 3,200) having a degree of acetylation of 20 mol %, a degree of butyralization of 50 mol %, and a hydroxy group content of 30 mol % was dissolved in pyridine. To the dissolved polyvinyl butyral resin was added 20 mol equivalents of acetic anhydride, and the mixture was stirred at 80° C. for 120 minutes. The pyridine was removed, and then the polyvinyl butyral resin was washed with water and dried. Thereby, a polyvinyl butyral resin t was obtained. With respect to the obtained polyvinyl butyral resin t, the degree of acetylation was 40 mol %, the degree of butyralization was 50 mol %, and the hydroxy group content was 10 mol %.

Synthesis Example 18

Synthesis of Polyvinyl Butyral Resin u

A polyvinyl butyral resin (average degree of polymerization: 3,200) having a degree of acetylation of 20 mol %, a degree of butyralization of 45 mol %, and a hydroxy group content of 35 mol % was dissolved in pyridine. To the dissolved polyvinyl butyral resin was added 30.7 mol equivalents of acetic anhydride, and the mixture was stirred at 80° C. for 120 minutes. The pyridine was removed, and then the polyvinyl butyral resin was washed with water and dried. Thereby, a polyvinyl butyral resin u was obtained. With respect to the obtained polyvinyl butyral resin u, the degree of acetylation was 50.7 mol %, the degree of butyralization was 45 mol %, and the hydroxy group content was 4.3 mol %.

Synthesis Example 19

Synthesis of Polyvinyl Butyral Resin v

A polyvinyl butyral resin (average degree of polymerization: 3,200) having a degree of acetylation of 30 mol %, a degree of butyralization of 33.5 mol %, and a hydroxy group content of 36.5 mol % was dissolved in pyridine. To the dissolved polyvinyl butyral resin was added 20.2 mol equivalents of acetic anhydride, and the mixture was stirred at 80° C. for 120 minutes. The pyridine was removed, and then the polyvinyl butyral resin was washed with water and dried. Thereby, a polyvinyl butyral resin v was obtained. With respect to the obtained polyvinyl butyral resin v, the degree of acetylation was 50.2 mol %, the degree of butyralization was 33.5 mol %, and the hydroxy group content was 16.3 mol %.

Synthesis Example 20

Synthesis of Polyvinyl Butyral Resin w

A polyvinyl butyral resin (average degree of polymerization: 3,200) having a degree of acetylation of 30 mol %, a degree of butyralization of 28.4 mol %, and a hydroxy group content of 41.6 mol % was dissolved in pyridine. To the dissolved polyvinyl butyral resin was added 20.5 mol equivalents of acetic anhydride, and the mixture was stirred at 80° C. for 120 minutes. The pyridine was removed, and then the polyvinyl butyral resin was washed with water and dried. Thereby, a polyvinyl butyral resin w was obtained. With respect to the obtained polyvinyl butyral resin w, the degree of acetylation was 50.5 mol %, the degree of butyralization was 28.4 mol %, and the hydroxy group content was 21.1 mol %.

Synthesis Example 21

Synthesis of Polyvinyl Butyral Resin x

A polyvinyl butyral resin (average degree of polymerization: 3,200) having a degree of acetylation of 30 mol %, a degree of butyralization of 35 mol %, and a hydroxy group content of 35 mol % was dissolved in pyridine. To the dissolved polyvinyl butyral resin was added 30 mol equivalents of acetic anhydride, and the mixture was stirred at 80° C. for 120 minutes. The pyridine was removed, and then the polyvinyl butyral resin was washed with water and dried. Thereby, a polyvinyl butyral resin x was obtained. With respect to the obtained polyvinyl butyral resin x, the degree of acetylation was 60 mol %, the degree of butyralization was 35 mol %, and the hydroxy group content was 5 mol %.

Synthesis Example 22

Synthesis of Polyvinyl Butyral Resin y

A polyvinyl butyral resin (average degree of polymerization: 3,200) having a degree of acetylation of 30 mol %, a degree of butyralization of 29.5 mol %, and a hydroxy group content of 40.5 mol % was dissolved in pyridine. To the dissolved polyvinyl butyral resin was added 30 mol equivalents of acetic anhydride, and the mixture was stirred at 80° C. for 120 minutes. The pyridine was removed, and then the polyvinyl butyral resin was washed with water and dried. Thereby, a polyvinyl butyral resin y was obtained. With respect to the obtained polyvinyl butyral resin y, the degree of acetylation was 60 mol %, the degree of butyralization was 29.5 mol %, and the hydroxy group content was 10.5 mol %.

Synthesis Example 23

Synthesis of Polyvinyl Butyral Resin z

A polyvinyl butyral resin (average degree of polymerization: 3,200) having a degree of acetylation of 30 mol %, a degree of butyralization of 24.3 mol %, and a hydroxy group content of 45.7 mol % was dissolved in pyridine. To the dissolved polyvinyl butyral resin was added 30 mol equivalents of acetic anhydride, and the mixture was stirred at 80° C. for 120 minutes. The pyridine was removed, and then the polyvinyl butyral resin was washed with water and dried. Thereby, a polyvinyl butyral resin z was obtained. With respect to the obtained polyvinyl butyral resin z, the degree of acetylation was 60 mol %, the degree of butyralization was 24.3 mol %, and the hydroxy group content was 15.7 mol %.

Synthesis Example 24

Synthesis of Polyvinyl Butyral Resin o

To 3,000 g of pure water was added 190 g of polyvinyl alcohol with a degree of saponification of 98.2% and a degree of polymerization of 1,700, and then the mixture was heated so that the polyvinyl alcohol was dissolved into the pure water. The temperature of the solution was controlled to 12° C. To the solution were added 212 g of 35 wt % hydrochloric acid and 136 g of n-butyl aldehyde, and a polyvinyl butyral resin was precipitated. Thereafter, the reaction system was kept at 50° C. for 4 hours, and the reaction was finished. The resin was washed with excess water so that unreacted n-butyl aldehyde was washed away. Further, the hydrochloric acid catalyst was neutralized and the salt was removed, and then the product was dried. Thereby, a polyvinyl butyral resin o was obtained. With respect to the obtained polyvinyl butyral resin o, the degree of acetylation was 1.8 mol %, the degree of butyralization was 68.5 mol %, and the hydroxy group content was 29.7 mol %.

Synthesis Example 25

Synthesis of Polyvinyl Butyral Resin p

To 3,000 g of pure water was added 190 g of polyvinyl alcohol with a degree of saponification of 98.8% and a degree of polymerization of 1,700, and then the mixture was heated so that the polyvinyl alcohol was dissolved into the pure water. The temperature of the solution was controlled to 12° C. To the solution were added 206 g of 35 wt % hydrochloric acid and 142 g of n-butyl aldehyde, and a polyvinyl butyral resin was precipitated. Thereafter, the reaction system was kept at 50° C. for 4 hours, and the reaction was finished. The resin was washed with excess water so that unreacted n-butyl aldehyde was washed away. Further, the hydrochloric acid catalyst was neutralized and the salt was removed, and then the product was dried. Thereby, a polyvinyl butyral resin p was obtained. With respect to the obtained polyvinyl butyral resin p, the degree of acetylation was 1.2 mol %, the degree of butyralization was 72.4 mol %, and the hydroxy group content was 26.4 mol %.

Synthesis Example 26

Synthesis of Polyvinyl Butyral Resin s

To 2,910 g of pure water was added 190 g of polyvinyl alcohol with a degree of polymerization of 1,700, and then the mixture was heated so that the polyvinyl alcohol was dissolved into the pure water. The temperature of the solution was controlled to 12° C. To the solution were added 201 g of 35 wt % hydrochloric acid and 122 g of n-butyl aldehyde, and a polyvinyl butyral resin was precipitated. Thereafter, the reaction system was kept at 50° C. for 4 hours, and the reaction was finished. The resin was washed with excess water so that unreacted n-butyl aldehyde was washed away. Further, the hydrochloric acid catalyst was neutralized and the salt was removed, and then the product was dried. Thereby, a polyvinyl butyral resin s was obtained. With respect to the obtained polyvinyl butyral resin s, the degree of acetylation was 1 mol %, the degree of butyralization was 62.5 mol %, and the hydroxy group content was 36.5 mol %.

Synthesis Example 27

Synthesis of Polyvinyl Butyral Resin AA

To 3,000 g of pure water was added 190 g of polyvinyl alcohol with a degree of saponification of 99.0% and a degree of polymerization of 1,700, and then the mixture was heated so that the polyvinyl alcohol was dissolved into the pure water. The temperature of the solution was controlled to 12° C. To the solution were added 212 g of 35 wt % hydrochloric acid and 124 g of n-butyl aldehyde, and a polyvinyl butyral resin was precipitated. Thereafter, the reaction system was kept at 50° C. for 4 hours, and the reaction was finished. The resin was washed with excess water so that unreacted n-butyl aldehyde was washed away. Further, the hydrochloric acid catalyst was neutralized and the salt was removed, and then the product was dried. Thereby, a polyvinyl butyral resin AA was obtained. With respect to the obtained polyvinyl butyral resin AA, the degree of acetylation was 1.0 mol %, the degree of butyralization was 62.5 mol %, and the hydroxy group content was 36.5 mol %.

Synthesis Example 28

Synthesis of Polyvinyl Butyral Resin AB

A resin AB was obtained by butyralization of polyvinyl alcohol with a degree of saponification of 87.2% and a degree of polymerization of 2,300 by a common method. With respect to the obtained polyvinyl butyral resin AB, the degree of acetylation was 12.8 mol %, the degree of butyralization was 63.5 mol %, and the hydroxy group content was 23.7 mol %.

Synthesis Example 29

Synthesis of Polyvinyl Butyral Resin AC

A resin AC was obtained by butyralization of polyvinyl alcohol with a degree of saponification of 70.5% and a degree of polymerization of 2,300 by a common method. With respect to the obtained polyvinyl butyral resin AC, the degree of acetylation was 29.5 mol %, the degree of butyralization was 34 mol %, and the hydroxy group content was 36.5 mol %.

Synthesis Example 30

Synthesis of Polyvinyl Butyral Resin AD

A resin AD was obtained by butyralization of polyvinyl alcohol with a degree of saponification of 70.5% and a degree of polymerization of 2,300 by a common method. With respect to the obtained polyvinyl butyral resin AD, the degree of acetylation was 29.5 mol %, the degree of butyralization was 30.0 mol %, and the hydroxy group content was 40.5 mol %.

Example 1

(1) Preparation of Intermediate Film

The obtained polyvinyl butyral resin a (degree of acetylation: 30.5 mol %, 100 parts by weight) and triethylene glycol di-2-ethyl hexanoate (50 parts by weight) as a plasticizer were sufficiently kneaded using a mixing roll, and thereby a composition for intermediate layer was obtained.

The polyvinyl butyral resin d (degree of acetylation: 1 mol %, 100 parts by weight) and triethylene glycol di-2-ethyl hexanoate (3GO, 20 parts by weight) as a plasticizer were sufficiently kneaded, and thereby a composition for protecting layer was obtained.

The obtained composition for intermediate layer and composition for protecting layer were molded using a co-extruder, and thereby a multilayer intermediate film (thickness: 0.8 mm) having a laminated structure of protecting layer B (thickness: 0.35 mm)/intermediate layer A (thickness: 0.1 mm)/protecting layer B (thickness: 0.35 mm) was prepared.

(2) Preparation of Laminated Glass Used for Measurement of Loss Factor

The obtained multilayer intermediate film was cut into a size of 30 mm in length×320 mm in width. Next, the multilayer intermediate film was sandwiched between two transparent float glasses (25 mm in length×305 mm in width×2.0 mm in thickness). The workpiece was maintained and vacuum-pressed at 90° C. for 30 minutes using a vacuum laminator, and thereby a laminate was obtained. Portions of the multilayer intermediate film bulged out of the glasses in the laminate were cut away, and thereby a laminated glass to be used for measurement of loss factor was obtained.

(3) Preparation of Laminated Glass Used in Bubble Formation Test A and Bubble Formation Test B The obtained multilayer intermediate film was cut into a size of 30 cm in length×15 cm in width, and then stored for 10 hours under the 23° C. condition. Embossment was formed on both surfaces of the obtained multilayer intermediate film, and the 10-point average roughness of the embossment was 30 μm. On the cut multilayer intermediate film, 6-mm-diameter through holes were formed at four respective points, each point being an intersection of a position that is 8 cm inside from one edge of the multilayer intermediate film in the length direction and a position that is 5 cm inside from one edge of the multilayer intermediate film in the width direction.

The multilayer intermediate film with the through holes was sandwiched between two transparent float glasses (30 cm in length×15 cm in width×2.5 mm in thickness), and thereby a laminate was obtained. The peripheral edge of the laminate was heat-sealed by 2 cm in width from the edge, and thereby the air remained in the embossment and the air remained in the through holes were sealed. This laminate was press-bonded at 135° C. and 1.2 MPa for 20 minutes, and thereby the residual air was dissolved into the multilayer intermediate film. As a result, a laminated glass to be used in the Bubble formation test A and the Bubble formation test B was obtained. The laminated glass to be used in the Bubble formation test A and the Bubble formation test B was prepared using one of the multilayer intermediate films of Examples 6 to 41 and Comparative Examples 2 to 4.

Examples 2 to 41 and Comparative Examples 1 to 4

Except that the types and amounts of the polyvinyl butyral resin and the types and amounts of the plasticizer used in the intermediate layer A and the protecting layers B were those shown in Tables 1 to 5, a multilayer intermediate film and a laminated glass were obtained in the same manner as in Example 1. Further, in Examples 12, 19, and 27, the thickness of the intermediate layer A was 0.13 mm and the thickness of each protecting layer B was 0.375 mm. In Examples 13, 20, and 28, the thickness of the intermediate layer A was 0.08 mm and the thickness of each protecting layer B was 0.36 mm.

(Evaluation)

(1) Peak Temperature of Tan δ at Low-Temperature Side, Peak Maximum Value of Tan δ at Low-Temperature Side, and Peak Maximum Value of Tan δ at High-Temperature Side The obtained intermediate film was stored in a 20° C. environment for one month, and then the intermediate film was cut out into a 8-mm-diameter circular shape. The temperature variance of the dynamic viscoelasticity was measured by a shear method using a rheometer ("ARES", Rheometric Scientific, Inc.) under the following conditions: a strain of 1.0%, a frequency of 1 Hz, and a temperature-increasing rate of 5° C./min. Thereby, the peak temperature of tan δ at low-temperature side, the peak maximum value of tan δ at low-temperature side, and the peak maximum value of tan δ at high-temperature side were measured.

(2) Loss Factor

A Laminated glass to be used for the measurement of loss factor was stored in a 20° C. environment for one month. The loss factor of the laminated glass stored in the 20° C. environment for one month was measured by a center exciting method at 20° C. using a measurement device "SA-01" (RION Co., Ltd.). The loss factor (loss factor at 20° C.) in the 4th mode of resonant frequency (around 3,150 Hz) of the loss factor obtained was evaluated.

Further, the loss factor of the laminated glass stored in the 20° C. environment for one month was measured by a center exciting method at 30° C. using a measurement device "SA-01" (RION Co., Ltd.). The loss factor (loss factor at 30° C.) in the 6th mode of resonant frequency (around 6,300 Hz) of the loss factor obtained was evaluated.

(3) Bubble Formation Test A (State of Bubble Formation)

With respect to each of the multilayer intermediate films in Examples 6 to 41 and Comparative Examples 2 to 4, five laminated glasses to be used in the bubble formation test A were produced, and then left to stand for 100 hours in a 50° C. oven. The left laminated glasses were visually observed for the presence of bubble formation and the size of the bubbles in a plan view, and the state of bubble formation was evaluated based on the following criteria.

[Criteria for the State of Bubble Formation in the Bubble Formation Test A]

The bubbles generated in the five laminated glasses each were approximated to an ellipse, and the area of the ellipse was defined as the area of the bubble. The areas of the ellipses observed in the five laminated glass were averaged, and the proportion (percentage) of the averaged value (bubble formation area) of the areas of the ellipses to the area (30 cm×15 cm) of the laminated glass was determined.

◯◯: No bubble formation was observed in any of five laminated glasses

◯: The ratio of the average value (bubble formation area) of the areas of bubble formation was lower than 5%

Δ: The ratio of the average value (bubble formation area) of the areas of bubble formation was 5% or higher and lower than 10% x: The ratio of the average value (bubble formation area) of the areas of bubble formation was 10% or higher (4) Bubble Formation Test B (State of Bubble Formation)

With respect to each of the multilayer intermediate films in Examples 6 to 41 and Comparative Examples 2 to 4, 30 laminated glasses to be used in the bubble formation test B were produced, and then left to stand for 24 hours in a 50° C. oven. The number of laminated glasses in which bubble formation was visually observed among the left laminated glasses was counted, and the state of bubble formation was evaluated based on the following criteria.

[Criteria for the State of Bubble Formation in the Bubble Formation Test B]

◯◯: The number of laminated glasses in which bubble formation was visually observed was 5 or less ◯: The number of laminated glasses in which bubble formation was visually observed was 6 or more and 10 or less Δ: The number of laminated glasses in which bubble formation was visually observed was 11 or more and 15 or less x: The number of laminated glasses in which bubble formation was visually observed was 16 or more (5) Measurement of Elastic Modulus G' by Test Method A The polyvinyl acetal resin to be contained in the intermediate layer (first layer) of the intermediate film for laminated glass of each of Examples 6 to 41 and Comparative Examples 2 to 4 (the polyvinyl acetal resin used for intermediate layer) (100 parts by weight) and triethylene glycol di-2-ethyl hexanoate (3GO) (60 parts by weight) as a plasticizer were sufficiently kneaded, and thereby a kneaded product was obtained. The obtained kneaded product was press-molded using a press-molding machine, and thereby a resin film A with an average thickness of 0.35 mm was obtained. The obtained resin film A was left for two hours at a temperature of 25° C. and a relative humidity of 30%. After two hours, the viscoelasticity was measured using ARES-G2 (TA INSTRUMENTS). The geometry used here was a 8-mm-diameter parallel plate. The measurement was performed under the condition wherein the temperature was lowered from 100° C. to −10° C. at a lowering rate of 3° C./min and under the condition with a frequency of 1 Hz and a strain of 1%. In the obtained measurement results, the peak temperature of the loss factor was defined as a glass transition temperature Tg (° C.). Further, Based on the obtained measurement results and the glass transition temperature Tg, the value of the elastic modulus G'(Tg+30) at (Tg+30)° C. and the value of the elastic modulus G'(Tg+80) at (Tg+80)° C. were read, and the ratio (G'(Tg+80)/G'(Tg+30)) was determined.

(6) Measurement of Elastic Modulus G' by Test Method B

The intermediate film for laminated glass of each of Examples 6 to 41 and Comparative Examples 2 to 4 was stored in a constant temperature and humidity facility (humidity: 30% (±3%), temperature: 23° C.) for one month. Immediately after the storage for one month, the surface layer, the intermediate layer, and the surface layer were separated, and thereby the intermediate layer was taken out. One gram of the separated intermediate layer was placed in a mold (2 cm in length×2 cm in width×0.76 mm in thickness) disposed between two polyethylene terephthalate (PET) films. The intermediate layer was preheated at a temperature of 150° C. and a pressure of 0 kg/cm² for 10 minutes, and then press-molded at 80 kg/cm² for 15 minutes. The press-molded intermediate layer was placed in a hand press set to 20° C. in advance, and then pressed at 10 MPa for 10 minutes. Thereby, the intermediate layer was cooled down. Next, one of the two PET films was peeled off from the mold disposed therebetween, and it was stored in a constant temperature and humidity facility (humidity: 30% (±3%), temperature: 23° C.) for 24 hours. Then, the viscoelasticity was measured using ARES-G2 (TA INSTRUMENTS). The geometry used here was a 8-mm-diameter parallel plate. The measurement was performed under the condition wherein the temperature was lowered from 100° C. to −10° C. at a lowering rate of 3° C./min and under the condition with a frequency of 1 Hz and a strain of 1%. In the obtained measurement results, the peak temperature of the loss factor was defined as a glass transition temperature Tg (° C.). Further, based on the obtained measurement results and the glass transition temperature Tg, the value of the elastic modulus G'(Tg+30) at (Tg+30)° C. and the value of the elastic modulus G'(Tg+80) at (Tg+80)° C. were read. In addition, the ratio (G'(Tg+80)/G'(Tg+30)) was determined.

(7) Measurement of Absolute Molecular Weight and Molecular Weight y (Measurement of Absolute Molecular Weight)

The absolute molecular weight and the molecular weight in terms of polystyrene for determining the ratio of the high-molecular-weight component X and the high-molecular-weight component Y mentioned in Synthesis Example 8 were values determined by separating the surface layers and the intermediate layer of the obtained multilayer intermediate film, and then performing the following steps.

In order to measure the absolute molecular weight, the multilayer intermediate film was left in a constant temperature and humidity facility (humidity: 30% (±3%), temperature: 23° C.) for one month. After one month, the surface layers and the intermediate layer of the intermediate film were separated. The separated intermediate layer was dissolved in tetrahydrofuran (THF) to prepare a 0.1 wt % solution. The obtained solution was analyzed using a Gel Permeation Chromatography (GPC) device (Hitachi High-Technologies Corp., RI: L2490, auto-sampler: L-2200, pump: L-2130, column oven: L-2350, columns: GL-A120-S and GL-A100MX-S in series). This GPC device was connected with a light scattering detector for GPC (VISCOTEK, Model 270 (RALS+VISCO)), and thus the chromatograms of the respective detectors can be analyzed. The peaks of the polyvinyl acetal resin component in the chromatograms of the RI detector and RALS detector were analyzed using an analysis software (OmniSEC), and thereby the absolute molecular weight at each elution time of the polyvinyl acetal resin was determined. The ratio of the area of a region where the absolute molecular weight of the polyvinyl acetal resin is 1,000,000 or higher in the peak area of the polyvinyl acetal resin detected by the RI detector was represented in percentage (%).

The following formulas hold for the peaks of the respective components in the chromatograms.

$$A_{RI} = c \times (dn/dc) \times K_{RI} \quad (1)$$

$$A_{RALS} = c \times M \times (dn/dc)^2 \times K_{RALS} \quad (2)$$

In the formulas, c represents the polymer concentration in solution, (dn/dc) represents the increment of refractive index, M represents the absolute molecular weight, and K represents the system's coefficient.

In the specific measurement procedure, first, 0.1 wt % THF solution was prepared using a polystyrene standard sample (VISCOTEK Corp., PolyCAL (registered trademark) TDS-PS-NB, Mw=98,390, dn/dc=0.185) with known c, M, and (dn/dc) values. Based on the GPC measurement result of the obtained polystyrene solution, the system's coefficient K of each detector was determined using the formula (1) and the formula (2).

Next, the separated intermediate layer was dissolved in THF, and thereby a THF solution was prepared. Based on the GPC measurement result of the obtained polyvinyl acetal resin solution, the absolute molecular weight M of the polyvinyl acetal resin was determined using the formula (1) and the formula (2).

Here, in order to analyze the intermediate layer (containing polyvinyl acetal resin and plasticizer), the concentration of the polyvinyl acetal resin in the polyvinyl acetal resin solution needs to be determined. The concentration of the polyvinyl acetal resin was calculated from result of the following measurement of amount of plasticizer.

Measurement of Amount of Plasticizer:

The plasticizer was dissolved in THF such that the amount of the plasticizer was to be 10% by weight, 15% by weight, 20% by weight, 25% by weight, 30% by weight, 35% by weight, 40% by weight, 45% by weight, or 50% by weight, and thereby a plasticizer-THF solution was prepared. The obtained plasticizer-THF solution was subjected to GPC measurement, and the peak area of the plasticizer was determined. The peak areas of the plasticizer were plotted with respect to each concentration of the plasticizer, and thereby an approximate straight line was obtained. Next, the THF solution containing the intermediate layer dissolved in THF was subjected to GPC measurement, and the amount of the plasticizer was determined from the peak area of the plasticizer using the approximate straight line.

(Measurement of Molecular Weight y)

In the same manner as in the aforementioned measurement method of the absolute molecular weight, the molecular weight in terms of polystyrene was measured by gel permeation chromatography (GPC). The proportion (%) of the high-molecular-weight component Y with a molecular weight y of 1,000,000 or higher in the polyvinyl acetal resin was calculated from the ratio of the area corresponding to a region where the molecular weight was 1,000,000 or higher among the peak areas detected by the RI detector (measurement results of GPC).

In order to measure the molecular weight in terms of polystyrene, the polystyrene standard samples with known molecular weights were subjected to GPC measurement. As the polystyrene standard samples ("Shodex Standard SM-105", "Shodex Standard SH-75", SHOWA DENKO K.K.) were used 14 samples with the respective weight average molecular weights of 580, 1,260, 2,960, 5,000, 10,100, 21,000, 28,500, 76,600, 196,000, 630,000, 1,130,000, 2,190,000, 3,150,000, and 3,900,000. Weight average molecular weights were plotted with respect to the corresponding elution times indicated by the peak tops of the peaks of the respective standard samples, and the obtained approximate straight line was used as a calibration curve. A multilayer intermediate film was left in a constant temperature and humidity facility (humidity: 30% (±3%), temperature: 23° C.) for one month, and then the surface layers and the intermediate layer were separated. The separated intermediate layer was dissolved in tetrahydrofuran (THF) to prepare a 0.1 wt % solution. The obtained solution was analyzed using a GPC device, and the peak area of the polyvinyl acetal resin in the intermediate layer was measured. Next, the area corresponding to the region where the molecular weight in terms of polystyrene of the polyvinyl acetal resin in the intermediate layer was 1,000,000 or higher was calculated from the elution time and the calibration curve of the polyvinyl acetal resin in the intermediate layer. The proportion (%) of the high-molecular-weight component Y with a molecular weight y of 1,000,000 or higher in the polyvinyl acetal resin was calculated by representing in percentage (%) the value obtained by dividing the area corresponding to the region where the molecular weight in terms of polystyrene of the polyvinyl acetal resin in the intermediate layer was 1,000,000 or higher by the peak area of the polyvinyl acetal resin in the intermediate layer.

The results are shown in the following Tables 1 to 5. In the following Tables 1 to 5, "3GO" represents triethylene glycol di-2-ethyl hexanoate, "DBA" represents dibutyl adipate, and "3 GB" represents triethylene glycol dibutyrate.

TABLE 1

| | | | Example 1 | Example 2 | Example 3 | Example 4 | Example 5 | Comparative Example 1 |
|---|---|---|---|---|---|---|---|---|
| Intermediate layer A | Resin | Type | a | b | c | f | g | e |
| | | Degree of butyralization (mol %) | 40 | 35 | 25 | 59 | 45 | 63.5 |
| | | Degree of acetylation (mol %) | 30.5 | 40 | 50 | 35 | 40 | 12.8 |
| | | Amount (parts by weight) | 100 | 100 | 100 | 100 | 100 | 100 |
| | Plasticizer | Type | 3GO | 3GO | 3GO | 3GO | 3GO | 3GO |
| | | Amount (parts by weight) | 50 | 45 | 40 | 40 | 40 | 60 |

TABLE 1-continued

|  |  |  | Example 1 | Example 2 | Example 3 | Example 4 | Example 5 | Comparative Example 1 |
|---|---|---|---|---|---|---|---|---|
| Protecting layer B | Resin | Type | d | d | d | d | d | d |
|  |  | Degree of butyralization (mol %) | 68.5 | 68.5 | 68.5 | 68.5 | 68.5 | 68.5 |
|  |  | Degree of acetylation (mol %) | 1 | 1 | 1 | 1 | 1 | 1 |
|  |  | Amount (parts by weight) | 100 | 100 | 100 | 100 | 100 | 100 |
|  | Plasticizer | Type | 3GO | 3GO | 3GO | 3GO | 3GO | 3GO |
|  |  | Amount (parts by weight) | 20 | 20 | 20 | 38.5 | 38.5 | 38.5 |
| Layer structure |  |  | B/A/B | B/A/B | B/A/B | B/A/B | B/A/B | B/A/B |
| Peak temperature of tan δ at low-temperature side |  |  | −2.4 | −3.2 | −4 | −2.8 | −3.6 | −1.8 |
| Peak maximum value of tan δ at low-temperature side |  |  | 1.38 | 1.46 | 1.51 | 1.58 | 1.64 | 1.05 |
| Peak maximum value of tan δ at high-temperature side |  |  | 0.56 | 0.59 | 0.55 | 0.52 | 0.51 | 0.54 |
| Loss factor at 20° C. around 3,150 Hz |  |  | 0.31 | 0.33 | 0.36 | 0.49 | 0.5 | 0.28 |
| Loss factor at 30° C. around 6,300 Hz |  |  | 0.12 | 0.14 | 0.16 | 0.17 | 0.18 | 0.09 |

TABLE 2

|  |  |  | Example 6 | Example 7 | Example 8 | Example 9 | Example 10 | Example 11 |
|---|---|---|---|---|---|---|---|---|
| Intermediate layer A | Resin | Type | h | i | j | k | l | m |
|  |  | Degree of butyralization (mol %) | 58 | 26 | 13 | 58 | 52 | 50 |
|  |  | Degree of acetylation (mol %) | 35 | 67 | 80 | 40 | 32 | 30.5 |
|  |  | Amount (parts by weight) | 100 | 100 | 100 | 100 | 100 | 100 |
|  | Plasticizer | Type | 3GO | 3GO | 3GO | 3GO | 3GO | 3GO |
|  |  | Amount (parts by weight) | 50 | 50 | 50 | 50 | 50 | 50 |
| Protecting layer B | Resin | Type | d | d | d | d | d | d |
|  |  | Degree of butyralization (mol %) | 68.5 | 68.5 | 68.5 | 68.5 | 68.5 | 68.5 |
|  |  | Degree of acetylation (mol %) | 1 | 1 | 1 | 1 | 1 | 1 |
|  |  | Amount (parts by weight) | 100 | 100 | 100 | 100 | 100 | 100 |
|  | Plasticizer | Type | 3GO | 3GO | 3GO | 3GO | 3GO | 3GO |
|  |  | Amount (parts by weight)) | 28 | 30 | 34 | 27 | 30 | 33 |
| Layer structure |  |  | B/A/B | B/A/B | B/A/B | B/A/B | B/A/B | B/A/B |
| Peak temperature of tan δ at low-temperature side (° C.) |  |  | −1.7 | −2.2 | −2.7 | −3.1 | −2.9 | −3.52 |
| Peak maximum value of tan δ at low-temperature side |  |  | 1.66 | 1.64 | 1.59 | 1.74 | 1.58 | 1.57 |
| Peak maximum value of tan δ at high-temperature side |  |  | 0.55 | 0.56 | 0.55 | 0.56 | 0.56 | 0.55 |
| Loss factor at 20° C. around 3,150 Hz |  |  | 0.53 | 0.52 | 0.51 | 0.56 | 0.49 | 0.49 |
| Loss factor at 30° C. around 6,300 Hz |  |  | 0.18 | 0.17 | 0.17 | 0.2 | 0.15 | 0.16 |
| Bubble formation test A (state of Bubble formation) |  |  | ◯◯ | ◯◯ | ◯◯ | ◯◯ | ◯◯ | ◯◯ |
| Bubble formation test B (state of Bubble formation) |  |  | ◯ | ◯ | ◯ | ◯ | ◯ | ◯ |
| Test method A: glass transition temperature (Tg) (° C.) |  |  | −2.51 | −2.9 | −3.2 | −3.7 | −3.5 | −2.88 |
| Test method A: G' (Tg + 30) (Pa) |  |  | 231500 | 223000 | 219000 | 212000 | 214500 | 234000 |
| Test method A: G' (Tg + 80) (Pa) |  |  | 158000 | 154600 | 149800 | 143000 | 145000 | 159000 |
| Test method A: G' (Tg + 80)/G' (Tg + 30) |  |  | 0.68 | 0.59 | 0.68 | 0.67 | 0.66 | 0.68 |
| Test method B: glass transition temperature (Tg) (° C.) |  |  | −4.72 | −4.22 | −6.2 | −5.8 | −5.41 | −4.12 |
| Test method B: G' (Tg + 30) (Pa) |  |  | 221500 | 216900 | 198500 | 201500 | 204300 | 225600 |
| Test method B: G' (Tg + 80) (Pa) |  |  | 150400 | 148300 | 132700 | 132500 | 135400 | 152700 |
| Test method B: G' (Tg + 80)/G' (Tg + 30) |  |  | 0.68 | 0.68 | 0.67 | 0.66 | 0.66 | 0.68 |

TABLE 2-continued

| | | | | | | | |
|---|---|---|---|---|---|---|---|
| Proportion of high-molecular-weight component X (%) | | | 19.6 | — | — | — | — | — |
| Proportion of high-molecular-weight component Y (%) | | | 23.1 | — | — | — | — | — |

| | | | Example 12 | Example 13 | Example 14 | Example 15 | Example 16 |
|---|---|---|---|---|---|---|---|
| Intermediate layer A | Resin | Type | n | n | n | n | n |
| | | Degree of butyralization (mol %) | 55 | 55 | 55 | 55 | 55 |
| | | Degree of acetylation (mol %) | 30.5 | 30.5 | 30.5 | 30.5 | 30.5 |
| | | Amount (parts by weight) | 100 | 100 | 100 | 100 | 100 |
| | Plasticizer | Type | 3GO | 3GO | 3GO | 3GO | 3GO |
| | | Amount (parts by weight) | 50 | 50 | 50 | 50 | 50 |
| Protecting layer B | Resin | Type | d | d | o | p | d |
| | | Degree of butyralization (mol %) | 68.5 | 68.5 | 68.5 | 72.4 | 68.5 |
| | | Degree of acetylation (mol %) | 1 | 1 | 1.8 | 1.2 | 1 |
| | | Amount (parts by weight) | 100 | 100 | 100 | 100 | 100 |
| | Plasticizer | Type | 3GO | 3GO | 3GO | 3GO | 3GO |
| | | Amount (parts by weight)) | 31 | 31 | 35 | 36 | 32.5 |
| Layer structure | | | B/A/B | B/A/B | B/A/B | B/A/B | B/A/B |
| Peak temperature of tan δ at low-temperature side (° C.) | | | −4.12 | −4.21 | −4.88 | −5.12 | −4.65 |
| Peak maximum value of tan δ at low-temperature side | | | 1.74 | 1.62 | 1.64 | 1.62 | 1.67 |
| Peak maximum value of tan δ at high-temperature side | | | 0.51 | 0.53 | 0.56 | 0.58 | 0.54 |
| Loss factor at 20° C. around 3,150 Hz | | | 0.55 | 0.5 | 0.51 | 0.5 | 0.52 |
| Loss factor at 30° C. around 6,300 Hz | | | 0.19 | 0.17 | 0.17 | 0.16 | 0.17 |
| Bubble formation test A (state of Bubble formation) | | | ∘∘ | ∘∘ | ∘∘ | ∘∘ | ∘∘ |
| Bubble formation test B (state of Bubble formation) | | | ∘ | ∘ | ∘ | ∘ | ∘ |
| Test method A: glass transition temperature (Tg) (° C.) | | | −4.67 | −4.67 | −4.67 | −4.67 | −4.67 |
| Test method A: G' (Tg + 30) (Pa) | | | 228500 | 228500 | 228500 | 228500 | 228500 |
| Test method A: G' (Tg + 80) (Pa) | | | 157900 | 157900 | 157900 | 157900 | 157900 |
| Test method A: G' (Tg + 80)/G' (Tg + 30) | | | 0.69 | 0.69 | 0.69 | 0.69 | 0.69 |
| Test method B: glass transition temperature (Tg) (° C.) | | | −4.53 | −4.6 | −5.12 | −5.33 | −5.02 |
| Test method B: G' (Tg + 30) (Pa) | | | 227500 | 227000 | 221300 | 220700 | 224300 |
| Test method B: G' (Tg + 80) (Pa) | | | 154300 | 156000 | 152800 | 150600 | 154200 |
| Test method B: G' (Tg + 80)/G' (Tg + 30) | | | 0.68 | 0.69 | 0.69 | 0.68 | 0.69 |
| Proportion of high-molecular-weight component X (%) | | | — | — | — | — | — |
| Proportion of high-molecular-weight component Y (%) | | | — | — | — | — | — |

TABLE 3

| | | | Example 17 | Example 18 | Example 19 | Example 20 | Example 21 | Example 22 |
|---|---|---|---|---|---|---|---|---|
| Intermediate layer A | Resin | Type | q | r | r | r | r | r |
| | | Degree of butyralization (mol %) | 65 | 45 | 45 | 45 | 45 | 45 |
| | | Degree of acetylation (mol %) | 30.5 | 40 | 40 | 40 | 40 | 40 |
| | | Amount (parts by weight) | 100 | 100 | 100 | 100 | 100 | 100 |
| | Plasticizer | Type | 3GO | 3GO | 3GO | 3GO | 3GO | 3GO |
| | | Amount (parts by weight) | 50 | 50 | 50 | 50 | 50 | 50 |

TABLE 3-continued

| Protecting layer B | Resin | Type | d | d | d | d | o | p |
|---|---|---|---|---|---|---|---|---|
| | | Degree of butyralization (mol %) | 68.5 | 68.5 | 68.5 | 68.5 | 68.5 | 72.4 |
| | | Degree of acetylation (mol %) | 1 | 1 | 1 | 1 | 1.8 | 1.2 |
| | | Amount (parts by weight) | 100 | 100 | 100 | 100 | 100 | 100 |
| | Plasticizer | Type | 3GO | 3GO | 3GO | 3GO | 3GO | 3GO |
| | | Amount (parts by weight) | 34 | 28 | 28 | 28 | 32 | 34 |
| Layer structure | | | B/A/B | B/A/B | B/A/B | B/A/B | B/A/B | B/A/B |
| Peak temperature of tan δ at low-temperature side (° C.) | | | −3.77 | −4.12 | −4.65 | −5.01 | −4.22 | −4.56 |
| Peak maximum value of tan δ at low-temperature side | | | 1.75 | 1.69 | 1.76 | 1.63 | 1.67 | 1.65 |
| Peak maximum value of tan δ at high-temperature side | | | 0.54 | 0.53 | 0.5 | 0.51 | 0.54 | 0.55 |
| Loss factor at 20° C. around 3,150 Hz | | | 0.56 | 0.52 | 0.55 | 0.5 | 0.51 | 0.51 |
| Loss factor at 30° C. around 6,300 Hz | | | 0.2 | 0.17 | 0.2 | 0.16 | 0.16 | 0.16 |
| Bubble formation test A (state of Bubble formation) | | | ⊚ | ⊚ | ⊚ | ⊚ | ⊚ | ⊚ |
| Bubble formation test B (state of Bubble formation) | | | ○ | ○ | ○ | ○ | ○ | ○ |
| Test method A: glass transition temperature(Tg) (° C.) | | | −6.43 | −8.21 | −8.21 | −8.21 | −8.21 | −8.21 |
| Test method A: G' (Tg + 30) (Pa) | | | 202700 | 210600 | 210600 | 210600 | 210600 | 210600 |
| Test method A: G' (Tg + 80) (Pa) | | | 136000 | 145700 | 145700 | 145700 | 145700 | 145700 |
| Test method A: G' (Tg + 80)/G' (Tg + 30) | | | 0.67 | 0.69 | 0.69 | 0.69 | 0.69 | 0.69 |
| Teat method B: glass transition temperature(Tg) (° C.) | | | −4.11 | −4.56 | −4.83 | −5.33 | −4.56 | −5.02 |
| Test method B: G' (Tg + 30) (Pa) | | | 219600 | 224600 | 226000 | 221500 | 225300 | 224600 |
| Test method B: G' (Tg + 80) (Pa) | | | 145800 | 152400 | 153200 | 153700 | 153000 | 153200 |
| Test method B: G' (Tg + 80)/G' (Tg + 30) | | | 0.66 | 0.68 | 0.68 | 0.69 | 0.68 | 0.68 |
| Proportion of high-molecular-weight component X (%) | | | — | — | — | — | — | — |
| Proportion of high-molecular-weight component Y (%) | | | — | — | — | — | — | — |

| | | | Example 23 | Example 24 | Example 25 | Example 26 | Example 27 |
|---|---|---|---|---|---|---|---|
| Intermediate layer A | Resin | Type | r | t | u | v | v |
| | | Degree of butyralization (mol %) | 45 | 50 | 45 | 33.5 | 33.5 |
| | | Degree of acetylation (mol %) | 40 | 40 | 50.7 | 50.2 | 50.2 |
| | | Amount (parts by weight) | 100 | 100 | 100 | 100 | 100 |
| | Plasticizer | Type | 3GO | 3GO | 3GO | 3GO | 3GO |
| | | Amount (parts by weight) | 50 | 50 | 50 | 50 | 50 |
| Protecting layer B | Resin | Type | s | d | d | d | d |
| | | Degree of butyralization (mol %) | 62.5 | 68.5 | 68.5 | 68.5 | 68.5 |
| | | Degree of acetylation (mol %) | 1 | 1 | 1 | 1 | 1 |
| | | Amount (parts by weight) | 100 | 100 | 100 | 100 | 100 |
| | Plasticizer | Type | 3GO | 3GO | 3GO | 3GO | 3GO |
| | | Amount (parts by weight) | 24 | 30 | 34 | 31 | 31 |
| Layer structure | | | B/A/B | B/A/B | B/A/B | B/A/B | B/A/B |
| Peak temperature of tan δ at low-temperature side (° C.) | | | −4.33 | −3.54 | −4.77 | −4.21 | −4.51 |
| Peak maximum value of tan δ at low-temperature side | | | 1.74 | 1.74 | 1.78 | 1.72 | 1.76 |
| Peak maximum value of tan δ at high-temperature side | | | 0.55 | 0.56 | 0.52 | 0.54 | 0.57 |
| Loss factor at 20° C. around 3,150 Hz | | | 0.55 | 0.56 | 0.57 | 0.55 | 0.56 |
| Loss factor at 30° C. around 6,300 Hz | | | 0.19 | 0.2 | 0.21 | 0.19 | 0.2 |
| Bubble formation test A (state of Bubble formation) | | | ⊚ | ⊚ | ⊚ | ⊚ | ⊚ |
| Bubble formation test B (state of Bubble formation) | | | ○ | ○ | ○ | ○ | ○ |
| Test method A: glass transition temperature(Tg) (° C.) | | | −12.14 | −5.77 | −3.12 | −5.68 | −5.68 |
| Test method A: G' (Tg + 30) (Pa) | | | 200400 | 205300 | 229200 | 224500 | 224500 |
| Test method A: G' (Tg + 80) (Pa) | | | 134500 | 136900 | 152900 | 153900 | 153900 |

TABLE 3-continued

|  | | | | | |
|---|---|---|---|---|---|
| Test method A: G' (Tg + 80)/G' (Tg + 30) | 0.67 | 0.67 | 0.67 | 0.69 | 0.69 |
| Teat method B: glass transition temperature(Tg) (° C.) | −4.83 | −4.1 | −5.04 | −4.51 | −4.86 |
| Test method B: G' (Tg + 30) (Pa) | 225600 | 220100 | 206400 | 227400 | 226000 |
| Test method B: G' (Tg + 80) (Pa) | 149700 | 148000 | 135900 | 156100 | 155800 |
| Test method B: G' (Tg + 80)/G' (Tg + 30) | 0.66 | 0.67 | 0.66 | 0.69 | 0.69 |
| Proportion of high-molecular-weight component X (%) | — | — | — | — | — |
| Proportion of high-molecular-weight component Y (%) | — | — | — | — | — |

TABLE 4

| | | | Example 28 | Example 29 | Example 30 | Example 31 | Example 32 | Example 33 |
|---|---|---|---|---|---|---|---|---|
| Intermediate layer A | Resin | Type | v | v | v | w | x | y |
| | | Degree of butyralization (mol %) | 33.5 | 33.5 | 33.5 | 28.4 | 35 | 29.5 |
| | | Degree of acetylation (mol %) | 50.2 | 50.2 | 50.2 | 50.5 | 60 | 60 |
| | | Amount (parts by weight) | 100 | 100 | 100 | 100 | 100 | 100 |
| | Plasticizer | Type | 3GO | 3GO | 3GO | 3GO | 3GO | 3GO |
| | | Amount (parts by weight) | 50 | 50 | 50 | 50 | 50 | 50 |
| Protecting layer B | Resin | Type | d | o | p | d | d | d |
| | | Degree of butyralization (mol %) | 68.5 | 68.5 | 72.4 | 68.5 | 68.5 | 68.5 |
| | | Degree of acetylation (mol %) | 1 | 1.8 | 1.2 | 1 | 1 | 1 |
| | | Amount (parts by weight) | 100 | 100 | 100 | 100 | 100 | 100 |
| | Plasticizer | Type | 3GO | 3GO | 3GO | 3GO | 3GO | 3GO |
| | | Amount (parts by weight) | 31 | 34 | 36 | 33 | 35 | 33 |
| Layer structure | | | B/A/B | B/A/B | B/A/B | B/A/B | B/A/B | B/A/B |
| Peak temperature of tan δ at low-temperature side (° C.) | | | −4.77 | −4.66 | −5.24 | −4.56 | −3.88 | −4.01 |
| Peak maximum value of tan δ at low-temperature side | | | 1.66 | 1.7 | 1.68 | 1.61 | 1.74 | 1.73 |
| Peak maximum value of tan δ at high-temperature side | | | 0.54 | 0.56 | 0.58 | 0.55 | 0.54 | 0.55 |
| Loss factor at 20° C. around 3,150 Hz | | | 0.51 | 0.52 | 0.52 | 0.5 | 0.55 | 0.54 |
| Loss factor at 30° C. around 6,300 Hz | | | 0.18 | 0.18 | 0.18 | 0.17 | 0.2 | 0.2 |
| Bubble formation test A (state of Bubble formation) | | | ⊚ | ⊚ | ⊚ | ⊚ | ⊚ | ⊚ |
| Bubble formation test B (state of Bubble formation) | | | ○ | ○ | ○ | ○ | ○ | ○ |
| Test method A: glass transition temperature (Tg) (° C.) | | | −5.68 | −5.68 | −5.68 | −3.84 | −2.52 | −3.86 |
| Test method A: G' (Tg + 30) (Pa) | | | 224500 | 224500 | 224300 | 228400 | 231800 | 229800 |
| Test method A: G' (Tg + 80) (Pa) | | | 153900 | 153900 | 153900 | 161000 | 154600 | 156000 |
| Test method A: G' (Tg + 80)/G' (Tg + 30) | | | 0.69 | 0.69 | 0.69 | 0.70 | 0.67 | 0.68 |
| Test method B: glass transition temperature (Tg) (° C.) | | | −5.22 | −5.05 | −5.64 | −5.37 | −4.11 | −4.5 |
| Test method B: G' (Tg + 30) (Pa) | | | 224700 | 218000 | 209300 | 210400 | 213800 | 220500 |
| Test method B: G' (Tg + 80) (Pa) | | | 156000 | 150800 | 143600 | 147600 | 140700 | 146800 |
| Test method B: G' (Tg + 80)/G' (Tg + 30) | | | 0.69 | 0.69 | 0.69 | 0.70 | 0.66 | 0.67 |
| Proportion of high-molecular-weight component X (%) | | | — | — | — | — | — | — |
| Proportion of high-molecular-weight component Y (%) | | | — | — | — | — | — | — |

| | | | Example 34 | Example 35 | Example 36 | Example 37 | Example 38 |
|---|---|---|---|---|---|---|---|
| Intermediate layer A | Resin | Type | y | y | y | y | z |
| | | Degree of butyralization (mol %) | 29.5 | 29.5 | 29.5 | 29.5 | 24.3 |
| | | Degree of acetylation (mol %) | 60 | 60 | 60 | 60 | 60 |

TABLE 4-continued

|  |  |  |  |  |  |  |  |
|---|---|---|---|---|---|---|---|
|  |  | Amount (parts by weight) | 100 | 100 | 100 | 100 | 100 |
|  | Plasticizer | Type | 3GO | 3GO | 3GO | 3GO | 3GO |
|  |  | Amount (parts by weight) | 50 | 50 | 50 | 50 | 50 |
| Protecting layer B | Resin | Type | d | d | o | p | d |
|  |  | Degree of butyralization (mol %) | 68.5 | 68.5 | 68.5 | 72.4 | 68.5 |
|  |  | Degree of acetylation (mol %) | 1 | 1 | 1.8 | 1.2 | 1 |
|  |  | Amount (parts by weight) | 100 | 100 | 100 | 100 | 100 |
|  | Plasticizer | Type | 3GO | 3GO | 3GO | 3GO | 3GO |
|  |  | Amount (parts by weight) | 33 | 33 | 36 | 37.5 | 35 |
| Layer structure |  |  | B/A/B | B/A/B | B/A/B | B/A/B | B/A/B |
| Peak temperature of tan δ at low-temperature side (° C.) |  |  | −4.23 | −4.56 | −4.22 | −5.02 | −4.65 |
| Peak maximum value of tan δ at low-temperature side |  |  | 1.75 | 1.63 | 1.7 | 1.68 | 1.61 |
| Peak maximum value of tan δ at high-temperature side |  |  | 0.51 | 0.53 | 0.57 | 0.58 | 0.57 |
| Loss factor at 20° C. around 3,150 Hz |  |  | 0.56 | 0.5 | 0.52 | 0.51 | 0.49 |
| Loss factor at 30° C. around 6,300 Hz |  |  | 0.2 | 0.18 | 0.18 | 0.18 | 0.17 |
| Bubble formation test A (state of Bubble formation) |  |  | ∘∘ | ∘∘ | ∘∘ | ∘∘ | ∘∘ |
| Bubble formation test B (state of Bubble formation) |  |  | ∘ | ∘ | ∘ | ∘ | ∘ |
| Test method A: glass transition temperature (Tg) (° C.) |  |  | −3.86 | −3.86 | −3.86 | −3.86 | −4.29 |
| Test method A: G' (Tg + 30) (Pa) |  |  | 229800 | 229800 | 229800 | 229800 | 227700 |
| Test method A: G' (Tg + 80) (Pa) |  |  | 156000 | 156000 | 156000 | 156000 | 160400 |
| Test method A: G' (Tg + 80)/G' (Tg + 30) |  |  | 0.68 | 0.68 | 0.68 | 0.68 | 0.70 |
| Test method B: glass transition temperature (Tg) (° C.) |  |  | −4.52 | −4.88 | −4.56 | −5.49 | −4.87 |
| Test method B: G' (Tg + 30) (Pa) |  |  | 220700 | 222200 | 218900 | 208100 | 223700 |
| Test method B: G' (Tg + 80) (Pa) |  |  | 147100 | 147900 | 148800 | 140600 | 157200 |
| Test method B: G' (Tg + 80)/G' (Tg + 30) |  |  | 0.67 | 0.67 | 0.68 | 0.68 | 0.70 |
| Proportion of high-molecular-weight component X (%) |  |  | — | — | — | — | — |
| Proportion of high-molecular-weight component Y (%) |  |  | — | — | — | — | — |

TABLE 5

|  |  |  | Example 39 | Example 40 | Example 41 | Comparative Example 2 | Comparative Example 3 | Comparative Example 4 |
|---|---|---|---|---|---|---|---|---|
| Intermediate layer A | Resin | Type | r | r | r | AB | AC | AD |
|  |  | Degree of butyralization (mol %) | 45 | 45 | 45 | 63.5 | 34 | 30 |
|  |  | Degree of acetylation (mol %) | 40 | 40 | 40 | 12.8 | 29.5 | 29.5 |
|  |  | Amount (parts by weight) | 100 | 100 | 100 | 100 | 100 | 100 |
|  | Kind of plasticizer |  | 3GB | DBA | 3GH | 3GO | 3GO | 3GO |
|  | Amount of plasticizer (parts by weight) |  | 40 | 40 | 50 | 60 | 60 | 60 |
| Protecting layer B | Resin | Type | AA | AA | d | d | d | d |
|  |  | Degree of butyralization (mol %) | 62.5 | 62.5 | 68.5 | 68.5 | 68.5 | 68.5 |
|  |  | Degree of acetylation (mol %) | 1 | 1 | 1 | 1 | 1 | 1 |
|  |  | Amount (parts by weight) | 100 | 100 | 100 | 100 | 100 | 100 |
|  | Kind of plasticizer |  | 3GB | DBA | 3GH | 3GO | 3GO | 3GO |
|  | Amount of plasticizer (parts by weight) |  | 30 | 30 | 26.5 | 37.5 | 37.5 | 37.5 |
| Layer structure |  |  | B/A/B | B/A/B | B/A/B | B/A/B | B/A/B | B/A/B |
| Peak temperature of tan δ at low-temperature side (° C.) |  |  | −4.27 | −4.02 | −3.24 | −2.43 | −2.85 | 4.22 |
| Peak maximum value of tan δ at low-temperature side |  |  | 1.82 | 1.75 | 1.73 | 1.03 | 1.05 | 1.07 |
| Peak maximum value of tan δ at high-temperature side |  |  | 0.56 | 0.55 | 0.55 | 0.53 | 0.53 | 0.53 |

TABLE 5-continued

|  | Example 39 | Example 40 | Example 41 | Comparative Example 2 | Comparative Example 3 | Comparative Example 4 |
|---|---|---|---|---|---|---|
| Loss factor at 20° C. around 3,150 Hz | 0.55 | 0.54 | 0.53 | 0.28 | 0.29 | 0.22 |
| Loss factor at 30° C. around 6,300 Hz | 0.19 | 0.18 | 0.18 | 0.09 | 0.09 | 0.14 |
| Bubble formation test A (state of Bubble formation) | ∘∘ | ∘∘ | ∘∘ | x | x | x |
| Bubble formation test B (state of Bubble formation) | ∘ | ∘ | ∘ | x | x | x |
| Test method A: glass transition temperature (Tg) (° C.) | −12.56 | −11.88 | −10.45 | 1.8 | 1.99 | 7.21 |
| Test method A: G' (Tg + 30) (Pa) | 184500 | 187500 | 211600 | 236500 | 237700 | 265000 |
| Test method A: G' (Tg + 80) (Pa) | 123900 | 128400 | 143700 | 142000 | 143500 | 163500 |
| Test method A: G' (Tg + 80)/G' (Tg + 30) | 0.67 | 0.68 | 0.68 | 0.60 | 0.60 | 0.62 |
| Test method B: glass transition temperature (Tg) (° C.) | −5.01 | −4.76 | −4.14 | −3.2 | −3.33 | 3.77 |
| Test method B: G' (Tg + 30) (Pa) | 224700 | 225600 | 229300 | 226000 | 227300 | 245700 |
| Test method B: G' (Tg + 80) (Pa) | 150000 | 150800 | 153600 | 131000 | 132500 | 146500 |
| Test method B: G' (Tg + 80)/G' (Tg + 30) | 0.67 | 0.67 | 0.67 | 0.58 | 0.58 | 0.60 |
| Proportion of high-molecular-weight component X (%) | — | — | — | — | — | — |
| Proportion of high-molecular-weight component Y (%) | — | — | — | — | — | — |

As shown in Tables 2 to 5, in the intermediate films for laminated glass in the examples and comparative examples, as the result of using the resin film B (first layer) containing the polyvinyl acetal resin constituting the first layer and the plasticizer constituting the first layer in amounts shown in Tables 2 to 5 and allowing the plasticizers to transfer between the respective layers of the multilayer intermediate film, and then measuring the elastic modulus G' of the resin film B (first layer), the ratio (G'(Tg+80)/G'(Tg+30)) of the resin film B was substantially the same as the ratio (G'(Tg+80)/G'(Tg+30)) of the resin film A containing 100 parts by weight of the polyvinyl acetal resin and 60 parts by weight of the 3GO contained in the first layer.

EXPLANATION OF SYMBOLS

1: intermediate film
1a: first surface
1b: second surface
2: first layer
2a: first surface
2b: second surface
3: second layer
3a: outer surface
4: third layer
4a: outer surface
11: laminated glass
21: first component for laminated glass
22: second component for laminated glass

The invention claimed is:
1. An intermediate film for laminated glass with a laminated structure of three or more layers, comprising:
a first layer containing a polyvinyl acetal resin and an organic ester plasticizer,
a second layer laminated on a first surface of the first layer, the second layer comprising a polyvinyl acetal resin and an organic ester plasticizer, and
a third layer laminated on a second surface of the first layer that is opposite to the first surface of the first layer, the third layer comprising a polyvinyl acetal resin and an organic ester plasticizer;
wherein a degree of acetylation of the polyvinyl acetal resin contained in the first layer exceeds 30 mol %,
a degree of acetylation of the polyvinyl acetal resin contained in the second layer is 0.1 mol % or higher and 20 mol % or lower, and
a degree of acetylation of the polyvinyl acetal resin contained in the third layer is 0.1 mol % or higher and 20 mol % or lower,
wherein an amount of the organic ester plasticizer in the second layer is 15 parts by weight or more and 45 parts by weight or less for each 100 parts by weight of the polyvinyl acetal resin in the second layer, and an amount of the organic ester plasticizer in the third layer is 15 parts by weight or more and 45 parts by weight or less for each 100 parts by weight of the polyvinyl acetal resin in the third layer,
wherein an amount of the organic ester plasticizer for each 100 parts by weight of the polyvinyl acetal resin in the second layer is lower than an amount of the organic ester plasticizer for each 100 parts by weight of the polyvinyl acetal resin in the first layer and an amount of the organic ester plasticizer for each 100 pans by weight of the polyvinyl acetal resin in the third layer is lower than an amount of the organic ester plasticizer for each 100 parts by weight of the polyvinyl acetal resin in the first layer,
wherein an amount of the organic ester plasticizer in the first layer is 50 parts by weight or more for each 100 parts by weight of the polyvinyl acetal resin in the first layer,
a hydroxy group content in the polyvinyl acetal resin contained in the first layer is lower than a hydroxy group content in the polyvinyl acetal resin contained in the second layer, and
the difference between the hydroxy group content in the polyvinyl acetal resin contained in the first layer and the hydroxy group content in the polyvinyl acetal resin contained in the second layer is 9.2 mol % or smaller,
wherein the polyvinyl acetal resin contained in the first layer contains a high-molecular-weight component with an absolute molecular weight of 1,000,000 or higher and a proportion of the high-molecular-weight component in the polyvinyl acetal resin contained in the first layer is 7.4% or higher, or the polyvinyl acetal resin contained in the first layer contains a high-molecular-weight component with a molecular weight in terms of polystyrene of 1,000,000 or higher and a proportion of the high-molecular-weight component with a molecular weight in terms of polystyrene in the polyvinyl acetal resin contained in the first layer is 9% or higher, and wherein a ratio (G'(Tg+80)/G'(Tg+30)) of an elastic modulus G'(Tg+80) at (Tg+80)° C. to an elastic modulus G'(Tg+30) at (Tg+30)° C. is 0.65 or higher, provided that a resin film containing 100 parts by weight of the polyvinyl acetal resin contained in the first layer and 60 parts by weight of triethylene glycol di-2-ethyl hexanoate (3GO) as a plasticizer is prepared and a viscoelasticity of the resin film is measured, and that Tg (° C.) represents a glass transition temperature of the resin film.

2. The intermediate film for laminated glass according to claim 1, wherein a ratio (G'(Tg+80)/G'(Tg+30)) of an elastic modulus G'(Tg+80) at (Tg+80)° C. to an elastic modulus G'(Tg+30) at (Tg+30)° C. is 0.65 or higher, provided that the first layer is used as a resin film and a viscoelasticity of the resin film is measured, and that Tg (° C.) represents a glass transition temperature of the resin film.

3. The intermediate film for laminated glass according to claim 1, wherein the polyvinyl acetal resin contained in the first layer is obtained by acetalizing a polyvinyl alcohol resin having an average degree of polymerization exceeding 3,000.

4. The intermediate film for laminated glass according to claim 1, wherein the acetal group in the polyvinyl acetal resin of one or more of the first, second and third layers has a carbon number of 3 to 5.

5. The intermediate film for laminated glass according to claim 1, wherein the polyvinyl acetal resin of one or more of the first, second and third layers is a polyvinyl butyral resin.

6. The intermediate film for laminated glass according to claim 1, wherein the polyvinyl acetal resin of the first layer has a hydroxy group content of 45 mol % or lower.

7. A laminated glass, comprising:
a first component for laminated glass;
a second component for laminated glass; and
an intermediate film sandwiched between the first component for laminated glass and the second component for laminated glass,
wherein the intermediate film is the intermediate film for laminated glass according to claim 1.

* * * * *